(12) United States Patent
Hamada

(10) Patent No.: US 8,670,616 B2
(45) Date of Patent: Mar. 11, 2014

(54) REGION SPECIFICATION METHOD, REGION SPECIFICATION APPARATUS, RECORDING MEDIUM, SERVER, AND SYSTEM

(71) Applicant: Casio Computer Co., Ltd., Tokyo (JP)

(72) Inventor: Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/908,370

(22) Filed: Jun. 3, 2013

(65) Prior Publication Data

US 2013/0266224 A1    Oct. 10, 2013

Related U.S. Application Data

(62) Division of application No. 13/295,403, filed on Nov. 14, 2011.

(30) Foreign Application Priority Data

Nov. 18, 2010 (JP) ................................ 2010-257389
Nov. 30, 2010 (JP) ................................ 2010-265865

(51) Int. Cl.
*G06K 9/34* (2006.01)
*G06K 9/48* (2006.01)

(52) U.S. Cl.
USPC .......................................... 382/173; 382/199

(58) Field of Classification Search
USPC ................... 382/173, 194, 195, 199
See application file for complete search history.

(56) References Cited

U.S. PATENT DOCUMENTS

| 6,104,827 | A  | * | 8/2000  | Benn et al. ..................... 382/110 |
| 6,973,220 | B2 | * | 12/2005 | Sakurai et al. .................. 382/266 |
| 8,150,191 | B2 | * | 4/2012  | Madnani ....................... 382/255 |
| 8,320,666 | B2 | * | 11/2012 | Gong ............................. 382/164 |
| 2004/0037460 | A1 |  | 2/2004 | Luo et al. |

(Continued)

FOREIGN PATENT DOCUMENTS

| JP | 2000-048213 A | 2/2000 |
| JP | 2002-245441 A | 8/2002 |
| JP | 2005-275447 A | 10/2005 |

OTHER PUBLICATIONS

Japanese Office Action dated Jan. 29, 2013, issued in counterpart Japanese Application No. 2010-257389, and English translation thereof.

(Continued)

*Primary Examiner* — Li Liu
(74) *Attorney, Agent, or Firm* — Holtz, Holtz, Goodman & Chick, PC

(57) ABSTRACT

A region specification method is provided of specifying a subject region including a subject from a subject existing image in which a background and the subject exist. The region specification method including: calculating an image boundary pixel number of an image boundary of the subject existing image constituting an edge part of each of divided regions into which the subject existing image is divided by a borderline defined on the subject existing image; specifying, from the divided regions, a reference region having a pixel percentage equal to or more than a predetermined percentage, the pixel percentage indicating the calculated image boundary pixel number in a total pixel number of the edge part; and specifying the subject region from the divided regions of the subject existing image by taking the reference region specified in the specifying the reference region as a reference.

13 Claims, 14 Drawing Sheets

(56) References Cited

U.S. PATENT DOCUMENTS

| | | | |
|---|---|---|---|
| 2005/0129326 A1* | 6/2005 | Matama | 382/254 |
| 2007/0147700 A1 | 6/2007 | Jeong et al. | |
| 2007/0269108 A1* | 11/2007 | Steinberg et al. | 382/173 |
| 2009/0010546 A1* | 1/2009 | Rossato et al. | 382/199 |
| 2010/0215259 A1 | 8/2010 | Scalise et al. | |
| 2011/0091107 A1* | 4/2011 | Sugihara | 382/173 |
| 2011/0158516 A1* | 6/2011 | Wu et al. | 382/165 |
| 2011/0206282 A1 | 8/2011 | Aisaka et al. | |
| 2011/0255792 A1* | 10/2011 | Guo | 382/199 |
| 2013/0121595 A1* | 5/2013 | Kawatani et al. | 382/199 |

OTHER PUBLICATIONS

Office Action dated Aug. 6, 2013, issued in parent application U.S. Appl. No. 13/295,403.

* cited by examiner

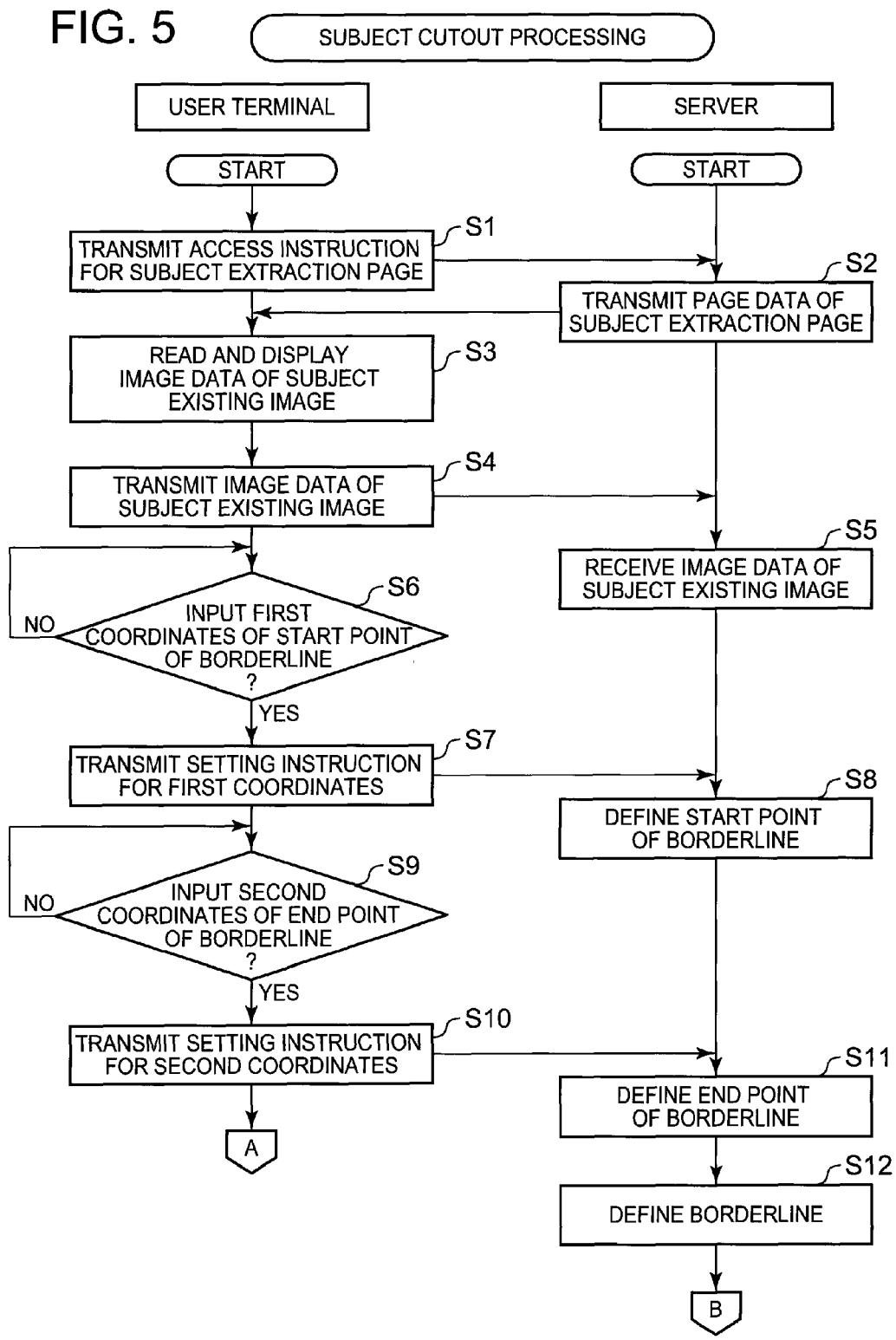

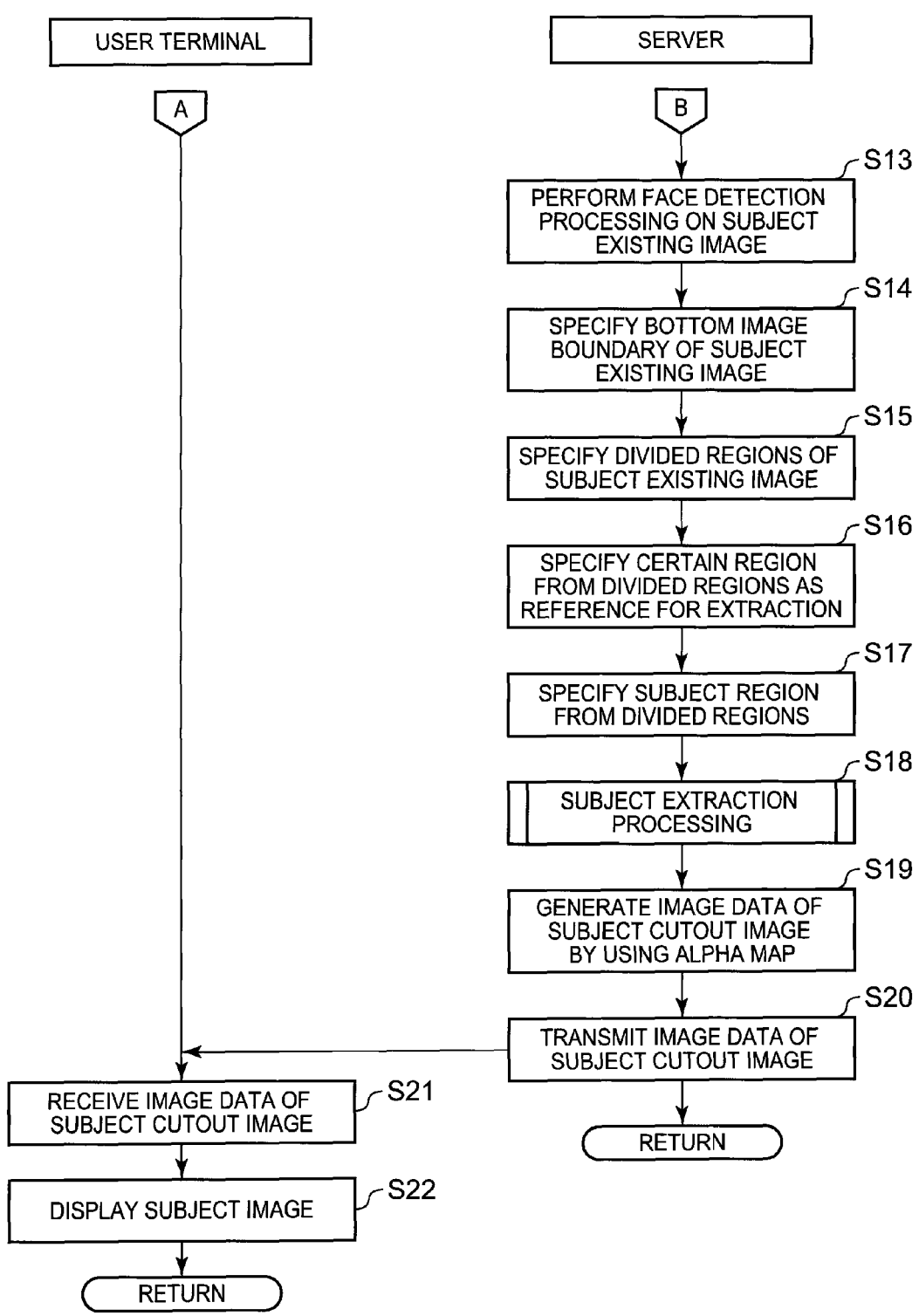

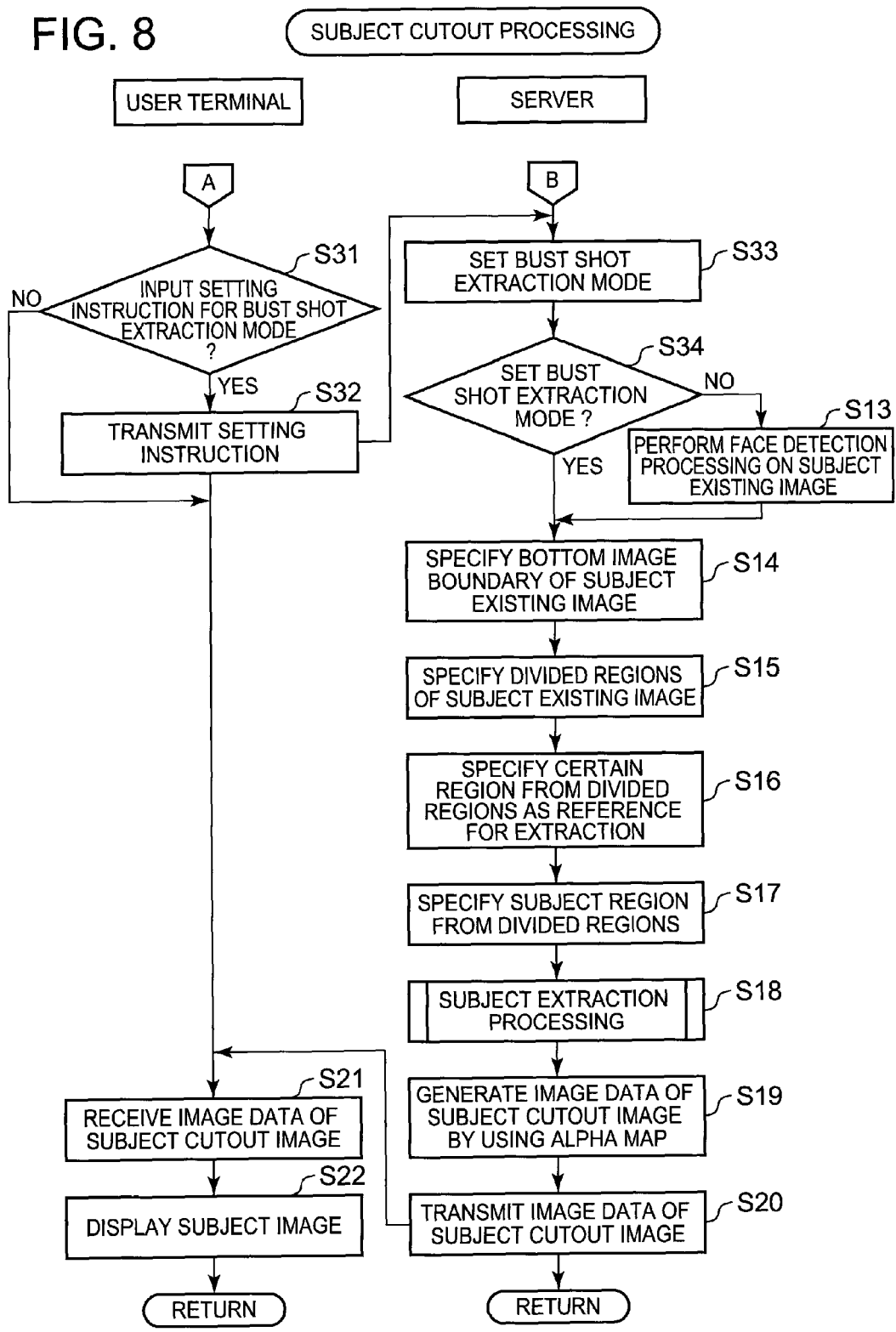

REGION SPECIFICATION METHOD, REGION SPECIFICATION APPARATUS, RECORDING MEDIUM, SERVER, AND SYSTEM

This is a Divisional of U.S. application Ser. No. 13/295,403, filed Nov. 14, 2011, which is based upon and claims the benefit of priority under 35 U.S.C. 119 of Japanese Patent Applications No. 2010-257389 filed on Nov. 18, 2010, and No. 2010-265865 filed on Nov. 30, 2010, the entire contents of all of which are incorporated herein by reference.

BACKGROUND OF THE INVENTION

1. Field of the Invention

The present invention relates to a region specification method, a region specification apparatus, a recording medium, a server, and a system.

2. Description of the Related Art

There is known, according to Japanese Patent Application Laid-Open Publication No. 2000-48213, a region specification apparatus in which an outline is drawn based on coordinate data successively inputted on an image, and a subject enclosed by the outline is extracted. Furthermore, there is known, according to Japanese Patent Application Laid-Open Publication No. 2005-275447, a region specification apparatus in which labeling processing is performed on a binary image generated from a taken image, and a pixel group having the largest area (largest pixel group) is specified as a subject region.

However, in the case of the region specification apparatus disclosed by Japanese Patent Application Laid-Open Publication No. 2000-48213, when the outline is not a completely closed curve, it is necessary to specify a divided region from a plurality of divided regions into which the image is divided by the outline.

Furthermore, in the case of the region specification apparatus disclosed by Japanese Patent Application Laid-Open Publication No. 2005-275447, when there is an inside pixel group in the largest pixel group, the inside pixel group which has a pixel percentage equal to or less than a predetermined percentage, the pixel percentage indicating a percentage of pixels of the inside pixel group in pixels of the largest pixel group, and which has a pixel value different from a pixel value of the largest pixel group, processing is performed to change the pixel value of each pixel of the inside pixel group to the pixel value of the largest pixel group. However, when, for example, the inside pixel group has the pixel percentage being more than the predetermined percentage, the pixel value of each pixel of the inside pixel group is not changed, and hence the subject region cannot be appropriately specified.

SUMMARY OF THE INVENTION

In view of the circumstances, an object of the present invention is to appropriately specify a predetermined region.

According to an embodiment of the present invention, there is provided a region specification method of specifying a subject region including a subject from a subject exiting image in which a background and the subject exist, the region specification method including: calculating an image boundary pixel number of an image boundary of the subject existing image constituting an edge part of each of divided regions into which the subject existing image is divided by a borderline defined on the subject existing image; specifying, from the divided regions, a reference region having a pixel percentage equal to or more than a predetermined percentage, the pixel percentage indicating the calculated image boundary pixel number in a total pixel number of the edge part; and specifying the subject region from the divided regions of the subject existing image by taking the reference region specified in the specifying the reference region as a reference.

According to another embodiment of the present invention, there is provided a region specification method of specifying a subject region including a subject from a subject existing image in which a background and the subject exist, the region specification method including: defining a borderline; and specifying a divided region of a plurality of divided regions into which the subject existing image is divided by the borderline defined on the subject existing image as the subject region without calculating a bottom image boundary pixel number of a bottom image boundary of an image boundary of the subject existing image, the divided region having a smallest image boundary pixel number of the image boundary constituting an edge part of the divided region.

According to another embodiment of the present invention, there is provided a region specification apparatus specifying a subject region including a subject from a subject existing image in which a background and the subject exist, the region specification apparatus including: a definition section which defines a borderline on the subject existing image displayed on a predetermined display region; a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and a subject region specification section which specifies the subject region from the divided regions of the subject existing image by taking the reference region specified by the reference region specification section as a reference.

According to another embodiment of the present invention, there is provided a recording medium recording a program allowing a region specification apparatus of a computer specifying a subject region including a subject from a subject existing image in which a background and the subject exist to function as: a definition section which defines a borderline on the subject existing image displayed on a predetermined display region; a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and a subject region specification section which specifies the subject region from the divided regions of the subject existing image by taking the reference region specified by the reference region specification section as a reference.

According to another embodiment of the present invention, there is provided a server connected with a terminal apparatus via a network, the server including: a reception section which receives image data of a subject existing image and a definition instruction to define a borderline on the subject existing image from the terminal apparatus; a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and a subject region specification section which specifies a subject region including a subject from the divided regions of the subject existing image by taking the reference region specified by the reference region specification section as a reference.

According to another embodiment of the present invention, there is provided a system including: a terminal apparatus; and a server connected with the terminal apparatus via a network, wherein the terminal apparatus includes: a transmission section which transmits image data of a subject existing image and a definition instruction to define a borderline on the subject existing image to the server, and the server includes: a reception section which receives the image data of the subject existing image and the definition instruction to define the borderline on the subject existing image transmitted from the terminal apparatus; a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and a subject region specification section which specifies a subject region including a subject from the divided regions of the subject existing image by taking the reference region specified by the reference region specification section as a reference.

According to another embodiment of the present invention, there is provided a region specification method of specifying a subject region including a subject from a subject existing image in which a background and the subject exist, the region specification method including: specifying a pixel group in which a pixel having a pixel value for the subject region of the subject existing image is successively disposed; specifying a corresponding bottom image boundary of a corresponding image boundary, the corresponding bottom image boundary corresponding to a bottom image boundary of an image boundary of the subject existing image displayed on a predetermined display region; and changing each pixel of a region enclosed by the pixel group specified in the specifying the pixel group and the corresponding bottom image boundary specified in the specifying the corresponding bottom image boundary, the pixel being for the background, to be for the subject region.

According to another embodiment of the present invention, there is provided a region specification apparatus specifying a subject region including a subject from a subject existing image in which a background and the subject exist, the region specification apparatus including: a pixel group specification section which specifies a pixel group in which a pixel having a pixel value for the subject region of the subject existing image is successively disposed; a corresponding bottom image boundary specification section which specifies a corresponding bottom image boundary of a corresponding image boundary, the corresponding bottom image boundary corresponding to a bottom image boundary of an image boundary of the subject existing image displayed on a predetermined display region; and a change section which changes each pixel of a region enclosed by the pixel group specified by the pixel group specification section and the corresponding bottom image boundary specified by the corresponding bottom image boundary specification section, the pixel being for the background, to be for the subject region.

According to another embodiment of the present invention, there is provided a recording medium recording a program for allowing a region specification apparatus of a computer specifying a subject region including a subject from a subject existing image in which a background and the subject exist to function as: a pixel group specification section which specifies a pixel group in which a pixel having a pixel value for the subject region of the subject existing image is successively disposed; a corresponding bottom image boundary specification section which specifies a corresponding bottom image boundary of a corresponding image boundary, the corresponding bottom image boundary corresponding to a bottom image boundary of an image boundary of the subject existing image displayed on a predetermined display region; and a change section which changes each pixel of a region enclosed by the pixel group specified by the pixel group specification section and the corresponding bottom image boundary specified by the corresponding bottom image boundary specification section, the pixel being for the background, to be for the subject region.

According to another embodiment of the present invention, there is provided a server connected with a terminal apparatus via a network, the server including: a reception section which receives image data of a subject existing image from the terminal apparatus; a pixel group specification section which specifies a pixel group in which a pixel having a pixel value for a subject region of the received subject existing image is successively disposed, the subject region including a subject; a corresponding bottom image boundary specification section which specifies a corresponding bottom image boundary of a corresponding image boundary, the corresponding bottom image boundary corresponding to a bottom image boundary of an image boundary of the subject existing image displayed on a predetermined display region; and a change section which changes each pixel of a region enclosed by the pixel group specified by the pixel group specification section and the corresponding bottom image boundary specified by the corresponding bottom image boundary specification section, the pixel being for the background, to be for the subject region.

According to another embodiment of the present invention, there is provided a system including: a terminal apparatus; and a server connected with the terminal apparatus via a network, wherein the terminal apparatus includes: a transmission section which transmits image data of a subject existing image, and the server includes: a reception section which receives the image data of the subject existing image transmitted from the terminal apparatus; a pixel group specification section which specifies a pixel group in which a pixel having a pixel value for a subject region of the received subject existing image is successively disposed, the subject region including a subject; a corresponding bottom image boundary specification section which specifies a corresponding bottom image boundary of a corresponding image boundary, the corresponding bottom image boundary corresponding to a bottom image boundary of an image boundary of the subject existing image displayed on a predetermined display region; and a change section which changes each pixel of a region enclosed by the pixel group specified by the pixel group specification section and the corresponding bottom image boundary specified by the corresponding bottom image boundary specification section, the pixel being for the background, to be for the subject region.

BRIEF DESCRIPTION OF THE SEVERAL VIEWS OF THE DRAWING

FIG. 5 is a first part of a flowchart showing subject cutout processing according to the first embodiment performed by the subject cutout system;

FIG. 6 is a second part of the flowchart showing the subject cutout processing;

FIG. 8 is a flowchart showing subject cutout processing according to a modification;

DETAILED DESCRIPTION OF THE INVENTION

First Embodiment

In the following, embodiments are described in detail with reference to the accompanying drawing. However, the scope of the present invention is not limited to the embodiments.

Figure 1:
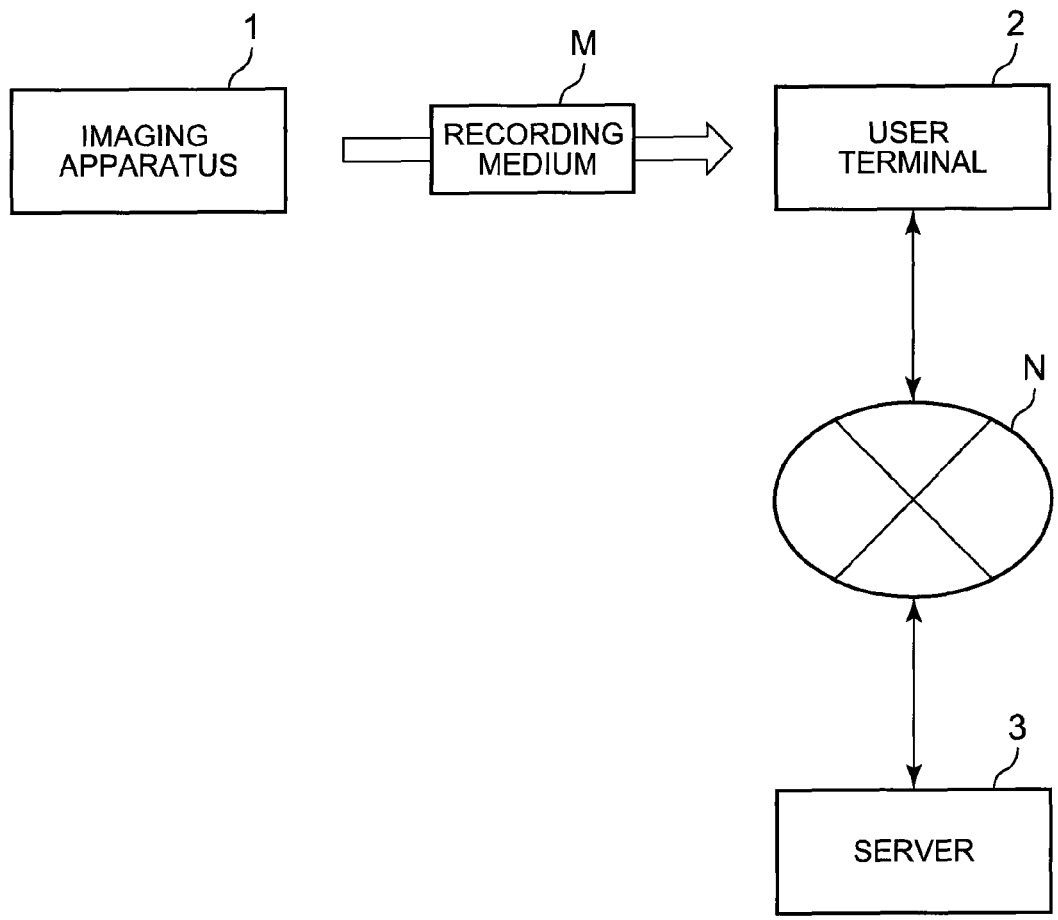
FIG. 1 is a block diagram showing a schematic configuration of a subject cutout system according to a first embodiment of the present invention.

FIG. 1 is a block diagram showing a schematic configuration of a subject cutout system 100 according to a first embodiment of the present invention.

In the subject cutout system 100 of the embodiment, a server 3 specifies a region Ac from a plurality of divided regions A of a subject exiting image P1, the divided regions A into which the subject existing image P1 is divided by a borderline L. The region Ac is a region having a pixel percentage equal to or more than a predetermined percentage. The pixel percentage expresses how many pixels in all the pixels of the edge part of a divided region A are pixels of image boundaries B of the subject existing image P1 as percentage. In other words, the pixel percentage indicates an image boundary pixel number of the image boundaries B of the subject existing image P1 constituting the edge part of a divided region A of the subject existing image P1 in a total pixel number of the edge part of the divided region A. The server 3 specifies a subject region As from the divided regions A of the subject existing image P1 by taking the specified region Ac as a reference.

More specifically, as shown in FIG. 1, the subject cutout system 100 includes an imaging apparatus 1, a user terminal 2, and the server 3. The user terminal 2 and the server 3 are connected with each other via a predetermined communication network N so as to transmit/receive various pieces of information with each other.

First, the imaging apparatus 1 is described with reference to FIG. 2.

Figure 2:
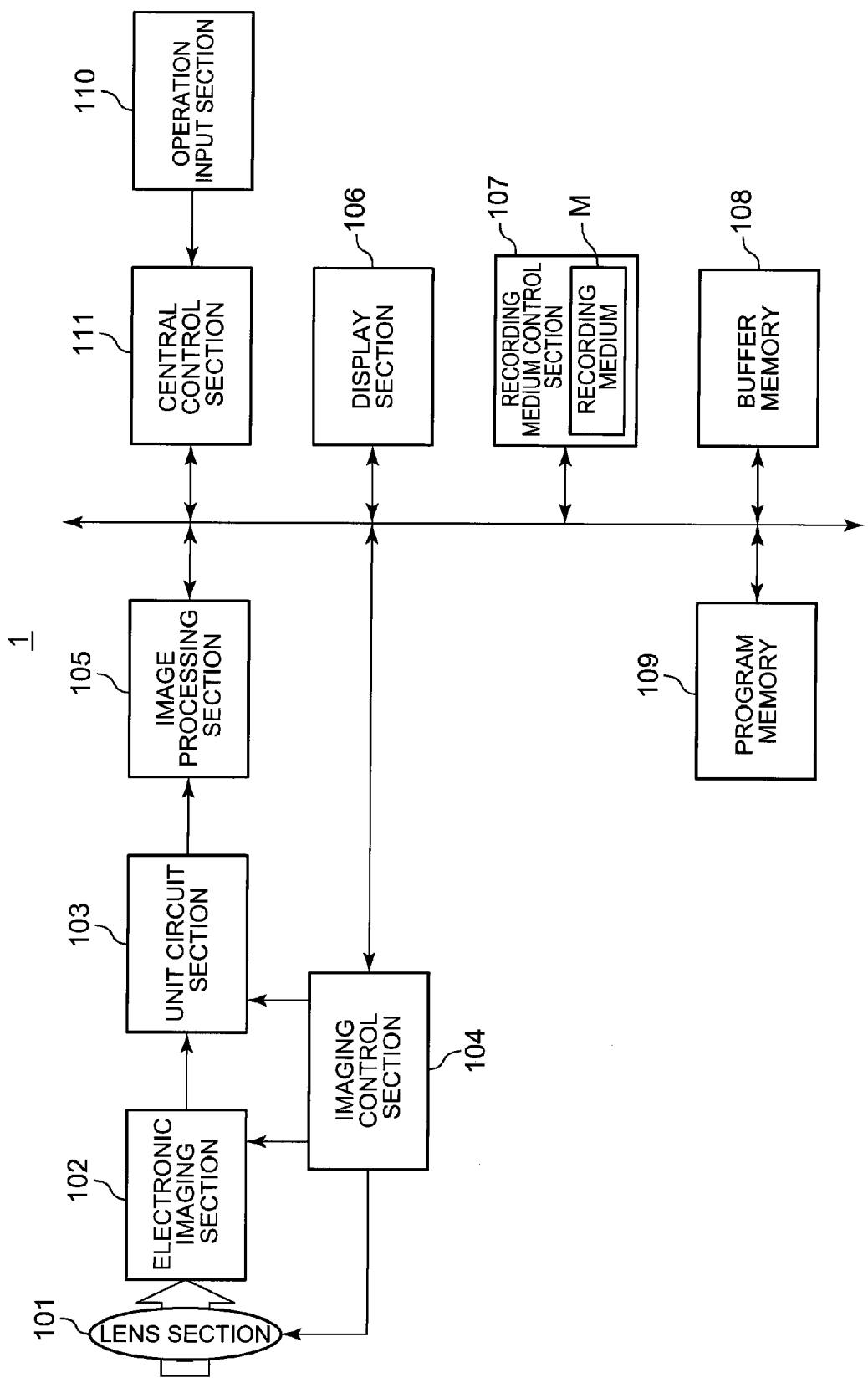
FIG. 2 is a block diagram showing a schematic configuration of an imaging apparatus of the subject cutout system.

FIG. 2 is a block diagram showing a schematic configuration of the imaging apparatus 1.

As shown in FIG. 2, the imaging apparatus 1 includes a lens section 101, an electronic imaging section 102, a unit circuit section 103, an imaging control section 104, an image processing section 105, a display section 106, a recording medium control section 107, a buffer memory 108, a program memory 109, an operation input section 110, and a central control section 111.

The lens section 101 includes, for example, a zoom lens, a focus lens, and an aperture (all not shown), and combines optical images of a subject, the optical images which pass through these lenses.

The electronic imaging section 102 is composed of, for example, an image sensor such as a CCD (Charge Coupled Device) or a CMOS (Complementary Metal-oxide Semiconductor). The electronic imaging section 102 converts the optical images which pass through the lenses of the lens section 101 into two-dimensional image signals (RGB image data), and outputs the image signals to the unit circuit section 103.

The unit circuit section 103 includes a CDS (Correlated Double Sampling) circuit, an AGC (Auto Gain Control) amplifier, and an ADC (Analog to Digital Converter) (all not shown). The unit circuit section 103 holds analog image signals corresponding to the optical images of the subject with the CDS circuit, the analog image signals which are outputted and inputted from the electronic imaging section 102, amplifies the image signals with the AGC amplifier, and then converts the amplified image signals into digital image signals with the ADC.

The imaging control section 104 controls, when an image of a subject is taken, operations of the lens section 101, the electronic imaging section 102, the unit circuit section 103, and the like based on commands from the central control section 111. More specifically, the imaging control section 104 controls drive of a lens motor (not shown) for moving the zoom lens or the focus lens of the lens section 101 on an optical axis, controls driving timing at which the electronic imaging section 102 is driven to perform scanning, and controls driving timing of the unit circuit section 103 based on the driving timing of the electronic imaging section 102.

The image processing unit 105 performs RGB interpolation by which data of R, G, and B color components (RGB data) for each pixel is generated, YUV conversion by which YUV data composed of a brightness signal (Y) and color difference signals (U and V) is generated from the RGB data for each pixel, and digital signal processing such as auto white balance or edge enhancement to improve the image quality. The image processing section 105 successively outputs the converted YUV data for each image frame to the buffer memory 108, and stores the data in the buffer memory 108.

After converting the YUV data for one frame stored in the buffer memory 108 to video signals, the display section 106 displays the video signals on a display screen thereof as a live view image. More specifically, the display section 106 displays the live view image at a predetermined display frame rate based on a plurality of image frames generated by taking images of a subject, or displays a rec-view image taken as a final image.

The recording medium control section 107 is configured in such a way that a recording medium M is detachable. The recording medium control section 107 controls reading of data from the attached recording medium M, and writing of data on the recording medium M. That is, the recording medium control section 107 records image data for recording of a taken image encoded by a JPEG compression section (not shown) of the image processing section 105 on the recording medium M. More specifically, the recording medium control section 107 records the image data for recording of the subject existing image P1 (shown in FIG. 7A) in which a background and a subject exist on the recording medium M.

The recording medium M is composed of, for example, a nonvolatile memory (flash memory) or the like. However, this is not a limit but an example, and hence the recording medium M may be composed of another element as needed.

The buffer memory 108 is a buffer to temporarily store image data and the like, and also used as a working memory or the like of the central control section 111 or the like.

The program memory 109 stores various programs for the functions of the imaging apparatus 1, the data therefor, and the like. The program memory 109 also stores; for example, program AE (Automatic Exposure) data constituting a program chart which shows combinations between f numbers (F) and shutter speeds for proper exposure values (EV) for the time of taking still images, performing continuous shooting, taking live view images, and the like; an EV table (both not shown); and the like.

The operation input section 110 is for performing predetermined operations of the imaging apparatus 1. More specifically, the operation input section 110 includes a shutter button for inputting image instructions to take images of a subject, a selection determination button for inputting selection instructions to select imaging modes and functions, and a zoom button for inputting adjustment instructions to adjust the amount of zoom (all not shown). In response to user's operations of these buttons, predetermined operation signals are outputted to the central control section 111.

The central control section 111 is composed of, for example, a one-chip microcomputer including a CPU which controls the components of the imaging apparatus 1.

The central control section 111 controls the components of the imaging apparatus 1 based on the operation signals outputted and inputted from the operation input section 110. More specifically, when a recording instruction signal outputted in response to a predetermined operation of the shutter bottom of the operation input section 110 is inputted into the central control section 111, the central control section 111 controls the driving timing of the electronic imaging section 102 and the driving timing of the unit circuit section 103 with the imaging control section 104 in accordance with a predetermined program stored in the program memory 109 so as to take a still image. The YUV data for one frame stored in the buffer memory 108 by taking the still image is compressed and encoded by the image processing section 105 using a JPEG method or the like, and recorded as still image data on the recording medium M.

Next, the user terminal 2 is described with reference to FIG. 3.

The user terminal 2 is composed of, for example, a personal computer or the like. The user terminal 2 accesses a web page (subject extraction page, for example) opened by the server 3, and inputs a specification instruction to define a borderline L on the subject existing image P1 on the web page.

Figure 3:
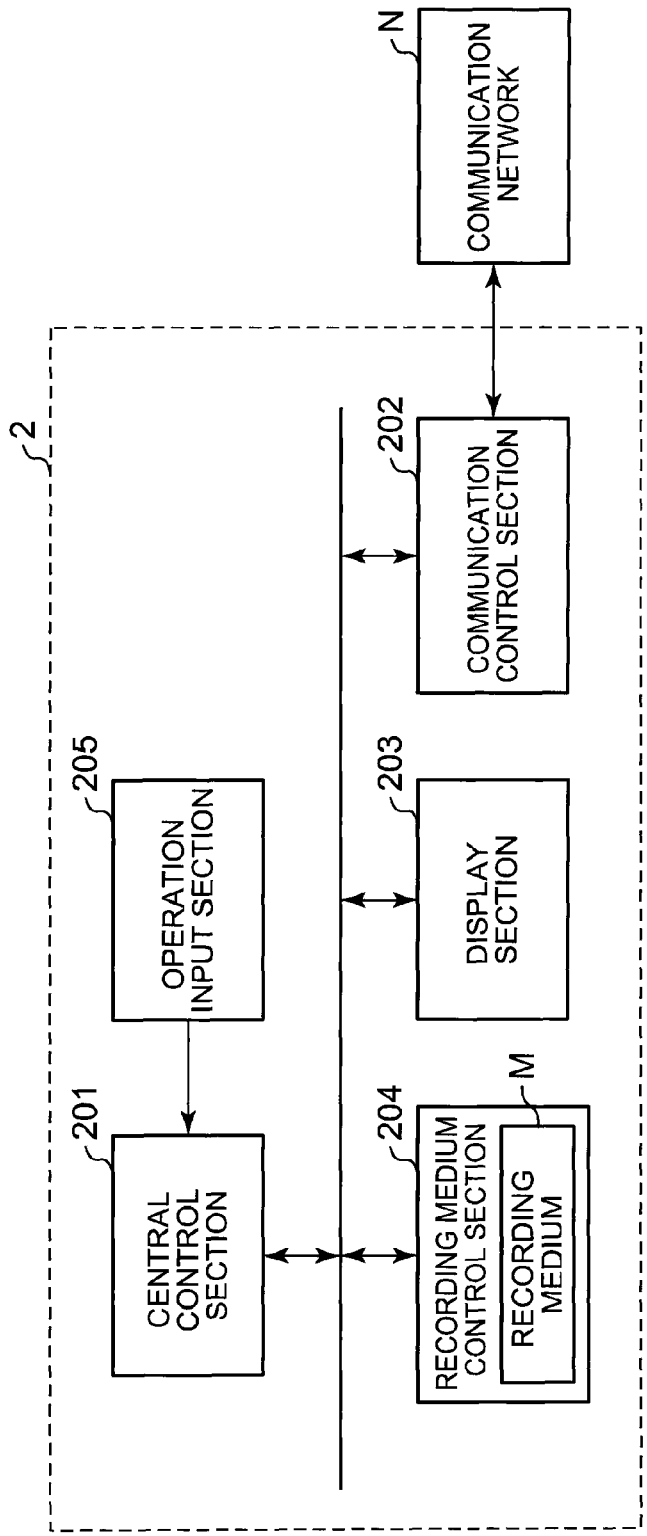
FIG. 3 is a block diagram showing a schematic configuration of a user terminal of the subject cutout system.

FIG. 3 is a block diagram showing a schematic configuration of the user terminal 2.

As shown in FIG. 3, the user terminal 2 includes a central control section 201, a communication control section 202, a display section 203, a recording medium control section 204, and an operation input section 205.

The central control section 201 controls the components of the user terminal 2. More specifically, the central control section 201 includes a CPU, a RAM, and a ROM (all not shown), and performs various control operations in accordance with various processing programs (not shown) for the user terminal 2 stored in the ROM. The CPU stores various processing results in a storage region in the RAM, and displays the processing results on the display section 203 as needed.

The RAM includes, for example, a program storage region to expand the processing programs and the like to be executed by the CPU, and a data storage region to store inputted data, the processing results produced when the processing programs are executed, and the like.

The ROM stores programs stored in a form of program codes readable by a computer. More specifically, the ROM stores a system program executable by the user terminal 2, various processing programs executable by the system program, data used when the various processing programs are executed, and the like.

The communication control section 202 is composed of, for example, a modem (Modulator/DEModulator), a terminal adapter, or the like. The communication control section 202 controls communications with an external apparatus such as the server 3 connected via a predetermined communication network N so as to transmit/receive information to/from the server 3.

The communication network N is constructed, for example, by using a leased line or a traditional normal public line, and various forms of lines such as a LAN (Local Area Network) and a WAN (Wide Area Network) can be applied thereto. Furthermore, the communication network N includes: various communication networks such as a telephone line network, an ISDN line network, a leased line network, a mobile communication network, a communications satellite line network, and a CATV line network; and an internet service provider by which these networks are connected.

The display section 203 is composed of a display such as an LCD or a CRT (Cathode Ray Tube). The display section 203 displays various pieces of information on a display screen thereof under the control of the CPU of the central control section 201.

More specifically, the display section 203 displays a web page (subject extraction page, for example) on the display screen thereof transmitted from the server 3 and received by the communication control section 202, based on the page data thereof.

The recoding medium control section 204 is configured in such a way that the recording medium M is detachable. The recording medium control section 204 controls reading of data from the attached recording medium M and writing of data on the recording medium M. That is, the recording medium control section 204 reads the image data of the subject existing image P1 for the subject cutout processing (described below) from the recording medium M which is detached from the imaging apparatus 1 and attached to the recording medium control section 204, and outputs the image data thereof to the communication control section 202.

Then, the communication control section 202 transmits the inputted image data of the subject existing image P1 to the server 3 via the predetermined communication network N.

The operation input section 205 includes a keyboard composed of, for example, data input keys for inputting numbers, characters, and the like, up, down, right, and left movement keys for data selection, sending operations, and the like, and various function keys, and a mouse. The operation input section 205 outputs depression signals of the keys depressed by a user and operation signals of the mouse to the CPU of the central control section 201.

More specifically, the operation input section 205 inputs setting instructions for the coordinates (x, y) of a plurality of points constituting the borderline L on the subject existing image P1 displayed on the display screen of the display section 203 at the time of the subject cutout processing (described below) based on predetermined operations by a user. For example, the operation input section 205 inputs the setting instructions for the coordinates of the points constituting the borderline L drawn on the subject existing image P1 based on the predetermined operations of the mouse by a user. Then, the operation input section 205 outputs predetermined setting signals corresponding to the operations to the CPU of the central control section 201.

The CPU transmits the setting signals outputted and inputted from the operation input section 205 with the communication control section 202 to the server 3 via the predetermined communication network N.

The operation input section 205 may be a touch panel (not shown) disposed on the display screen of the display section 203, and the setting instructions for the coordinates (x, y) of the points constituting the borderline L may be inputted in accordance with touched positions on the touch panel.

Next, the server 3 is described with reference to FIG. 4.

The server 3 has a function to open a web page (subject extraction page, for example) on the Internet as a web (World Wide Web) server 3. Furthermore, when accessed by the user terminal 2, the server 3 transmits page data of the web page to the user terminal 2. Also, the server 3 defines the borderline L based on inputs of setting instructions for the coordinates (x, y) of a plurality of points constituting the borderline L, the setting instructions which are outputted from the user terminal 2, and specifies a subject region As which includes a subject from the divided regions A into which the subject existing image P1 is divided by the borderline L.

Figure 4:
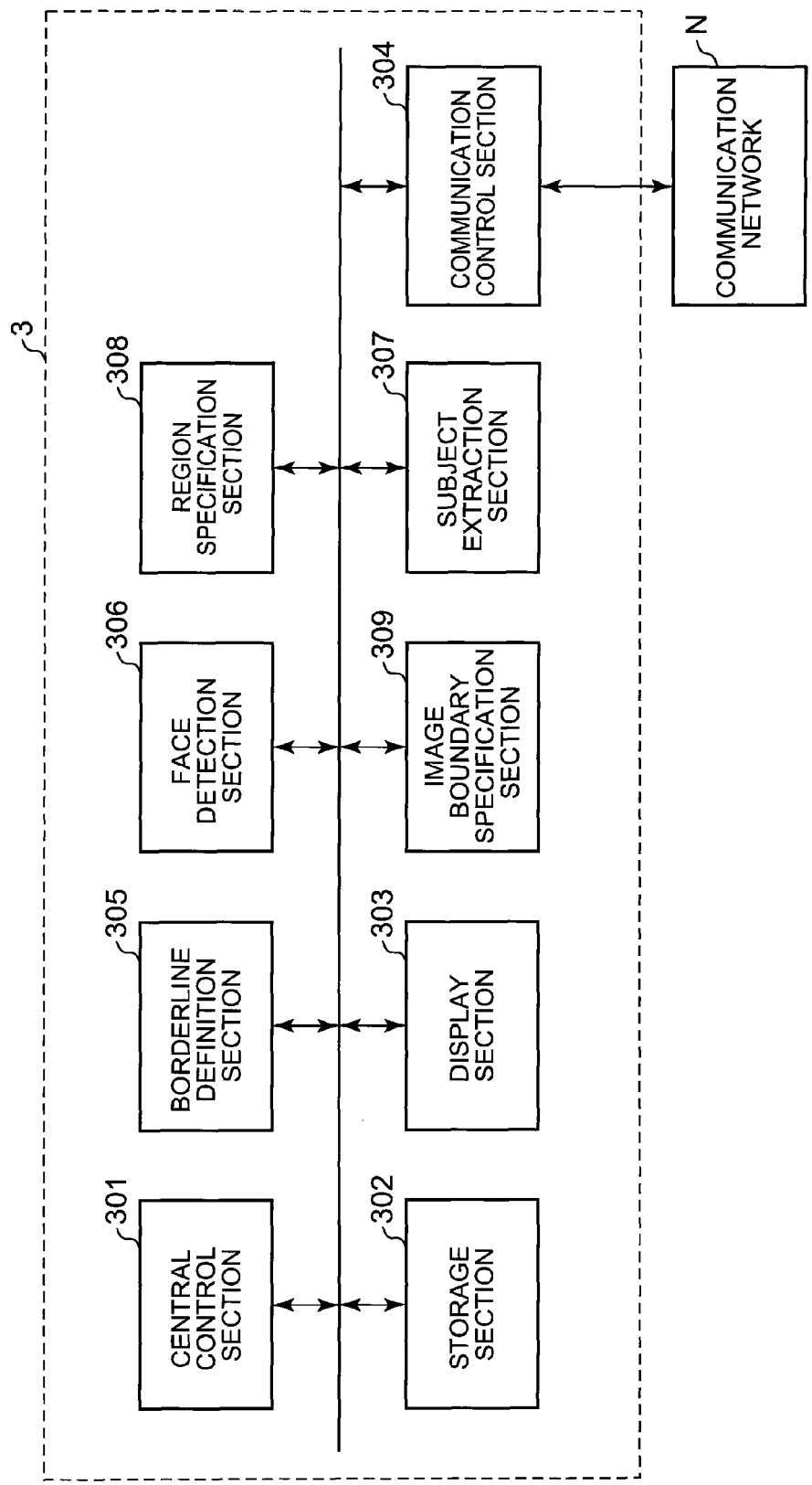
FIG. 4 is a block diagram showing a schematic configuration of a server of the subject cutout system.

FIG. 4 is a block diagram showing a schematic configuration of the server 3.

As shown in FIG. 4, the server 3 includes a central control section 301, a storage section 302, a display section 303, a communication control section 304, a borderline definition section 305, a face detection section 306, an image boundary specification section 309, a region specification section 308, and a subject extraction section 307.

The central control section 301 controls the components of the server 3. More specifically, the central control section 301 includes a CPU, a RAM, and a ROM (all not shown), and the CPU performs various control operations in accordance with various processing programs (not shown) for the server 3 stored in the ROM. The CPU stores various processing results in a storage region in the RAM, and displays the processing results on the display section 303 as needed.

The RAM includes, for example, a program storage region to expand the processing programs and the like to be executed by the CPU, and a data storage region to store inputted data, the processing results produced when the processing programs are executed, and the like.

The ROM stores programs stored in a form of program codes readable by a computer. More specifically, the ROM stores a system program executable by the server 3, various processing programs executable by the system program, data used when the various processing programs are executed, and the like.

The storage section 302 is composed of, for example, a nonvolatile semiconductor memory or an HHD (Hard Disc Drive). The storage section 302 stores, for example, the page data of the web page, which is transmitted to the user terminal 2.

The display section 303 is composed of, for example, a display such as an LCD or a CRT. The display section 303 displays various pieces of information on a display screen thereof under the control of the CPU of the central control section 301.

The communication control section 304 is composed of, for example, a modem, a terminal adapter, or the like. The communication control section 304 controls communications with an external apparatus such as the user terminal 2 connected via a predetermined communication network N so as to transmit/receive information to/from the user terminal 2.

More specifically, in the subject cutout processing (described below), the communication control section 304 receives the setting signals (instructions) for the coordinates of the points constituting the borderline L on the subject existing image P1, the setting signals which are transmitted from the user terminal 2 via the predetermined communication network N, and outputs the setting signals to the CPU of the central control section 301, for example.

The borderline definition section 305 defines the borderline L which serves as a boundary in the subject existing image P1.

That is, in the subject cutout processing, the borderline definition section 305 specifies the coordinates of a plurality of points on the subject existing image P1 based on the image data of the subject existing image P1 and the setting signals for the coordinates of the points constituting the borderline L drawn on the subject existing image P1, the image data thereof and the setting signals which are transmitted from the user terminal 2 and received by the communication control section 304 via the predetermined communication network N, and then, connects the points so as to define the borderline L.

Figure 7A:
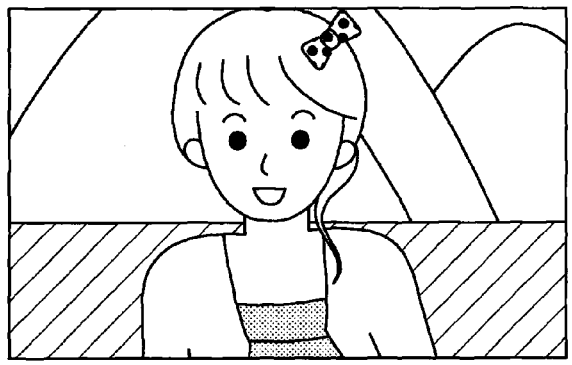
FIG. 7A schematically shows an image of the subject cutout processing shown in FIGS. 5 and 6.
Figure 7B:
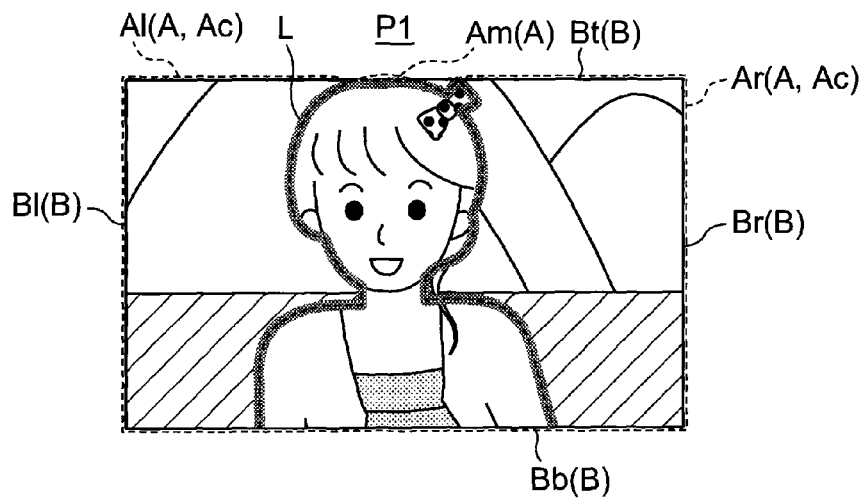
FIG. 7B schematically shows an image of the subject cutout processing shown in FIGS. 5 and 6.

The borderline L may be formed to enclose a certain region, or may be formed to have a start point and an end point thereof at different positions on the image boundaries B of the subject existing image P1 (shown in FIG. 7B).

The face detection section 306 detects a face region which includes the face of a subject from the subject existing image P1.

That is, the face detection section 306 obtains the image data of the subject existing image P1 which is transmitted from the user terminal 2 and received by the communication control section 304 via the predetermined communication network N, and performs predetermined face detection processing on the image data thereof so as to detect the face region.

In the face detection processing, the face region including not the face of a person but the face of, for example, an animal may be detected. The face detection processing is a known technology, and hence the detailed description thereof is omitted.

The image boundary specification section 309 specifies a bottom image boundary Bb from a plurality of image boundaries B of the subject existing image P1.

That is, the image boundary specification section 309 obtains the image data of the subject existing image P1 transmitted from the user terminal 2 and received by the communication control section 304 via the predetermined communication network N. Then, the image boundary specification section 309 specifies the bottom image boundary Bb from the four image boundaries B, which are the top image boundary Bt, the bottom image boundary Bb, the left image boundary Bl, and the right image boundary Br, of the image data thereof. The bottom image boundary Bb is located at the bottom (lower side) of the subject existing image P1 displayed on a predetermined display region on the display section 203 or the like of the user terminal 2. More specifically, the image boundary specification section 309 specifies, from the plurality of image boundaries B of the subject existing image P1, the image boundary B which is located below the face of the subject in the face region detected by the face detection section 306, as the bottom image boundary Bb.

That is, for example, in the case where the subject existing image P1 is an image of a person as a subject from the breasts up, namely, a bust shot, the image boundary specification section 309 specifies, from the four image boundaries Bt, Bb, Bl, and Br, the image boundary B with which an image region which is below the face of the person overlaps, as the bottom image boundary Bb.

Furthermore, the image boundary specification section 309 may obtain information on the direction of an image for when the subject existing image P1 is taken so as to specify the bottom image boundary Bb of the subject existing image P1, for example. The information is attached to the subject existing image P1 as Exif tag information.

The region specification section 308 specifies the region Ac which serves as a reference when the subject region As is specified, from the divided regions A into which the subject existing image P1 is divided by the borderline L.

That is, the region specification section 308 specifies the divided regions A into which the subject existing image P1 is divided by the image boundaries B and the borderline L of the subject existing image P1. The region specification section 308 also calculates the number of pixels of the edge part of each divided region A. For example, as shown in FIG. 7B, the region specification section 308 specifies, as the divided regions A into which the subject existing image P1 is divided by the four image boundaries Bt, Bb, Bl, and Br, and the borderline L, the left divided region Al, the right divided region Ar, and the middle divided region Am. In addition, the region specification section 308 calculates, with respect to each of the specified divided regions A, a total pixel number of the edge part of the divide region A by summing up the number of pixels along the edge part of the divided region A.

Then, the region specification section 308 specifies the region Ac from the divided regions A, namely, the left divided region Al, the right divided region Ar, and the middle divided region Am. The region Ac is a region having the pixel percentage equal to or more than a predetermined percentage (40%, for example). The pixel percentage expresses how many pixels in all the pixels of the edge part of a divided region A are pixels of the image boundaries B of the subject existing image P1 as percentage. For example, in the case of the left divided region Al, the total pixel number is calculated by summing up the number of pixels of the left image boundary Bl, the number of pixels of a part of the top image boundary Bt on the left side, the number of pixels of a part of the bottom image boundary Bb on the left side, and the number of pixels of a part of the borderline L, the part which is drawn along the subject on the left side as one faces. Then, the region specification section 308 judges whether or not the pixel percentage of the left divided region Al is equal to or more than the predetermined percentage. That is, the region specification section 308 judges whether or not the pixel percentage of the image boundary pixel number, namely, pixels of the left image boundary Bl, the part of the top image boundary Bt on the left side, and the part of the bottom image boundary Bb on the left side, in the total pixel number is equal to or more than the predetermined percentage. The region specification section 308 judges the same with respect to the right divided region Ar and the middle divided region Am.

The region specification section 308 may specify the region Ac. That is, the region specification section 308 may specify the region Ac having a pixel percentage equal to or more than a predetermined pixel percentage, from the divided regions A of the subject existing image P1. Here, the pixel percentage expresses how many pixels in all the pixels of the edge part of a divided region A (pixels of the bottom image boundary Bb constituting the edge part thereof is not necessary to be included in the total pixel number) are pixels of the image boundaries B except for the bottom image boundary Bb of the subject existing image P1 as percentage.

For example, as shown in FIG. 7B, the region specification section 308 judges that the pixel percentage of each of the left divided region Al and the right divided region Ar is equal to or more than the predetermined pixel percentage. The pixel percentage expresses how many pixels in all the pixels of the edge part of a divided region A are pixels of the image boundaries B of the subject existing image P as percentage. Then, the region specification section 308 specifies the left divided region Al and the right divided region Ar as the regions Ac.

The subject extraction section 307 specifies and extracts the subject region As from the divided regions A of the subject existing image P1.

That is, the subject extraction section 307 specifies the subject region As from the divided regions A of the subject existing image P1 by taking the region/regions Ac specified by the region specification section 308 as a reference. More specifically, the subject extraction section 307 excludes, among the divided regions A, the region/regions Ac (the left divided region Al and the right divided region Ar, for example) specified by the region specification section 308 from the list of candidates for the subject region As, thereby specifying the subject region As.

The subject extraction section 307 may specify the subject region As from the divided regions A of the subject existing image P1 by taking the result of the detection performed by the face detection section 306 as a reference. More specifically, the subject extraction section 307 may specify, from the divided regions A of the subject existing image P1, a divided region A having the largest number of pixels of the bottom image boundary Bb which is located below the face of the subject detected by the face detection section 306 (the middle divided region Am, for example) as the subject region As.

For example, as shown in FIG. 7B, the subject extraction section 307 excludes, of the divided regions A of the subject existing image P1, the left divided region Al and the right divided region Ar which are specified as the regions Ac, from the list of candidates for the subject region As. The subject extraction section 307 specifies the middle divided region Am which has the largest number of pixels of the bottom image boundary Bb as the subject region As. Then, the subject extraction section 307 extracts the subject region As by a predetermined extraction method described below, and generates a subject image, thereafter.

Here, an example of the extraction method of extracting the subject region As is described in detail.

The subject extraction section 307 first assumes that the left divided region Al and the right divided region Ar are the background. Next, the subject extraction section 307 performs a predetermined mathematical operation based on the pixel value of each pixel of the left divided region Al and the right divided region Ar so as to assume that the background color of a subject is a predetermined one color. Then, the subject extraction section 307 generates difference information on differences between a predetermined one-color background image and the subject existing image P1 pixel by pixel (a difference degree map, for example).

The subject extraction section 307 compares each of the pixel values of the pixels of the generated deference information with a predetermined threshold value, so as to binarize the pixel values, and then, performs reduction processing to eliminate regions in which differences caused by small noise or camera shake exist, thereby excluding pixel groups, the values of which are smaller than a predetermined value, and/or thin-line pixel groups produced by the camera shake. Then, the subject extraction section 307 performs labeling processing by which a same number is attached to pixels of a same connected component so as to produce a plurality of pixel groups, and specifies a pixel group having the largest area (largest pixel group) as a subject part. After that, the subject extraction section 307 performs enlargement processing by which the reduction by the reduction processing is corrected, and then performs the labeling processing only inside the subject part so as to perform filling-up processing by which an inside pixel group having a label percentage equal to or less than a predetermined percentage is replaced by the subject part. The label percentage expresses the number of background labels in the number of subject-part labels as percentage.

The subject extraction section 307 indicates the position of the subject region As in the subject existing image P1, and generates an extraction image for extracting the subject region As. As the extraction image, for example, an alpha map is used. The alpha map shows the weight by an $\alpha$ value ($0 \leq \alpha \leq 1$) for each pixel of the subject existing image P1 used when alpha blending is performed on a subject image and a predetermined background. For example, the subject extraction section 307 performs low-pass filtering on the binarized difference information in which the largest pixel group is "1" and the other part is "0", so as to produce an intermediate value at a border part therebetween, thereby creating an $\alpha$ value. In this case, the subject region As has an $\alpha$ value of 1 and a transparency of 0% to the predetermined background of the subject existing image P1. On the other hand, the background part of the subject has an $\alpha$ value of 0 and a transparency of 100% to the predetermined background of the subject existing image P1.

Then, the subject extraction section 307 combines the subject image with a predetermined one-color image P3 based on the generated extraction image (alpha map) in such a way as, of the pixels of the subject existing image P1, not to allow the pixels having an $\alpha$ value of 1 to pass through the predetermined one-color image P3, and to allow the pixels having an $\alpha$ value of 0 to pass through the predetermined one-color image P3, thereby generating image data of a subject cutout image P2.

In the embodiment, the subject extraction section 307 extracts the subject region As after specifying the subject region As. However, the extraction of the subject region As is not always necessary. That is, logic circuits dedicated to the specification of the subject region As and dedicated to the extraction of the subject region As may be provided independently.

Next, the subject cutout processing performed by the user terminal 2 and the server 3 is described with reference to FIGS. 5 to 7.

Figure 7C:
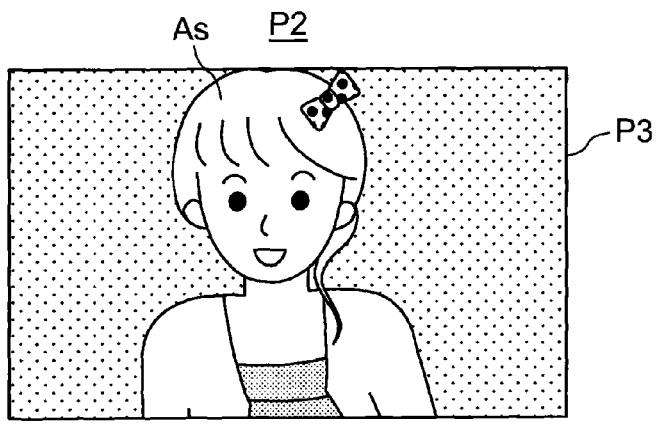
FIG. 7C schematically shows an image of the subject cutout processing shown in FIGS. 5 and 6.

FIGS. 5 and 6 show a flowchart showing the subject cutout processing according to the embodiment of the present invention. FIGS. 7A to 7C schematically show examples of images of the subject cutout processing.

In the following, the recording medium M on which the image data of the subject existing image P1 generated by the imaging apparatus 1 is recorded is attached to the recording medium control section 204 of the user terminal 2.

As shown in FIG. 5, when an access instruction to access a subject extraction page opened by the server 3 is inputted into the central control section 201 of the user terminal 2 based on a predetermined operation of the operation input section 205 by a user, the CPU of the central control section 201 transmits the access instruction with the communication control section 202 to the server 3 via the predetermined communication network N (Step S1).

When the communication control section 304 of the server 3 receives the access instruction transmitted from the user terminal 2, the CPU of the central control section 301 transmits page data of the subject extraction page with the communication control section 304 to the user terminal 2 via the predetermined communication network N (Step S2).

When the communication control section 202 of the user terminal 2 receives the page data of the subject extraction page, the display section 203 displays a predetermined subject extraction page on the display screen thereof based on the page data of the subject extraction page.

After the recording medium control section 204 of the user terminal 2 reads the image data of the subject existing image P1 for the subject cutout processing from the recording medium M, the display section 203 displays the image data of the subject existing image P1 on the display screen thereof (Step S3).

Then, the communication control section 202 transmits the image data of the read subject existing image P1 to the server 3 via the predetermined communication network N (Step S4).

Note that transmitting the image data of the subject existing image P1 to the server 3 in a state in which the user terminal 2 accesses the subject extraction page opened by the server 3 based on the predetermined operation of the operation input section 205 by a user is a clear statement that the user intends to use the subject cutout system 100. That is, starting from the transmission of the image data of the subject existing image P1, the server 3 of the subject cutout system 100 extracts the subject region As from the image data of the subject existing image P1 (described below), which is regarded as being equivalent to that the user uses the subject cutout system 100 for a service as a whole.

The communication control section 304 of the server 3 receives the image data of the subject existing image P1 transmitted from the user terminal 2 (Step S5).

Then, the central control section 201 judges whether or not the coordinates (first coordinates) of the start point of the borderline L are inputted on the subject existing image P1 displayed on the display screen of the display section 203 based on the predetermined operation of the operation input section 205 by the user (Step S6). That is, the central control section 201 judges whether or not the first coordinates of the start point are inputted based on the predetermined operation of the mouse by the user. The start point is a point drawn first among a plurality of points constituting the borderline L, the points which are successively drawn on the subject existing image P1.

The judgment at Step S6 is repeatedly made until it is judged that the first coordinates of the start point of the borderline L are inputted (Step S6; YES).

When judging that the first coordinate of the start point of the borderline L are inputted (Step S6; YES), the CPU of the central control section 201 transmits a setting instruction signal for the first coordinates outputted and inputted from the operation input section 205 to the server 3 via the predetermined communication network N (Step S7).

When the communication control section 304 of the server 3 receives the setting instruction signal for the first coordinates transmitted from the user terminal 2, the borderline definition section 305 defines the coordinates of the start point of the borderline L on the subject existing image P1 based on the setting instruction signal for the first coordinates and the image data of the subject existing image P1 (Step S8).

Next, the central control section 201 of the user terminal 2 judges whether or not the coordinates (second coordinates) of the end point of the borderline L are inputted on the subject existing image P1 displayed on the display screen of the display section 203 based on the predetermined operation of the operation input section 205 by the user (Step S9). That is, the central control section 201 judges whether or not the second coordinates of the end point are inputted based on the predetermined operation of the mouse by the user. The end point is a point drawn last among the plurality of points constituting the borderline L, the points which are successively drawn on the subject existing image P1.

The judgment at Step S9 is repeatedly made until it is judged that the second coordinates of the end point of the borderline L are inputted (Step S9; YES). The coordinates of the points constituting the borderline L, the points which are successively drawn on the subject exiting image P1, are successively transmitted from the user terminal 2 to the server 3 based on the predetermined operation of the mouse by the user.

When judging that the second coordinates of the end point of the borderline L are inputted (Step S9; YES), the CPU of the central control section 201 transmits a setting instruction signal for the second coordinates outputted and inputted from the operation input section 205 with the communication control section 202 to the server 3 via the predetermined communication network N (Step S10).

When the communication control section 304 of the server 3 receives the setting instruction signal for the second coordinates transmitted from the user terminal 2, the borderline definition section 305 defines the coordinates of the end point of the borderline L on the subject existing image P1 based on the setting instruction signal for the second coordinates and the image data of the subject existing image P1 (Step S11).

Then, the borderline definition section 305 connects the coordinates of the plurality of points constituting the borderline L, the points which are successively drawn on the subject existing image P1, so as to define the borderline L which is a continuous line from the start point to the end point (Step S12).

Next, the face detection section 306 obtains the image data of the subject existing image P1, and performs predetermined face detection processing on the image data thereof so as to detect the face region (Step S13).

Next, the image boundary specification section 309 specifies the bottom image boundary Bb from the plurality of image boundaries B of the subject existing image P1 (Step S14). More specifically, the image boundary specification section 309 obtains the image data of the subject existing image P1, and, from the four image boundaries B, namely, the top image boundary Bt, the bottom image boundary Bb, the left image boundary Bl, and the right image boundary Br, specifies the image boundary B which is located below the face of the subject in the face region detected by the face detection section 306, as the bottom image boundary Bb. If the face region is not detected at Step S13, simply, the image boundary at the lower side of the subject existing image P1 displayed on the display section 203 of the user terminal 2 may be specified as the bottom image boundary Bb.

Then, the region specification section 308 specifies the left divided region Al, the right divided region Ar, and the middle divided region Am as the divided regions A into which the subject exiting image P1 is divided by the four image boundaries B, namely, the top image boundary Bt, the bottom image boundary Bb, the left image boundary Bl, and the right image boundary Br, and the borderline L (Step S15). Furthermore, the region specification section 308 calculates, with respect to each of the specified divided regions A, the total pixel number of the edge part of the divided region A by summing up the number of pixels along the edge part of the divided region A.

Next, the region specification section 308 specifies the region Ac from the specified divided regions A, namely, the left divided region Al, the right divided region Ar, and the middle divided region Am (Step S16). The region Ac is a region having the pixel percentage equal to or more than a predetermined percentage (40%, for example). The pixel percentage expresses how many pixels in all the pixels of the edge part of a divided region A are pixels of the image boundaries B of the subject existing image P as percentage. For example, the region specification section 308 judges that each of the left divided region Al and the right divided region Ar has the pixel percentage equal to or more than the predetermined percentage, thereby specifying the left divided region Al and the right divided region Ar as the regions Ac.

Next, the subject extraction section 307 specifies the subject region As from the divided regions A of the subject existing image P1 (Step S17). More specifically, the subject extraction section 307 excludes, of the divided regions A of the subject existing image P1, the left divided region Al and the right divided region Ar which are specified as the regions Ac from the list of candidates for the subject region As, and specifies the middle divided region Am which includes the largest number of pixels of the bottom image boundary Bb, as the subject region As.

Next, the subject extraction section 307 performs subject extraction processing by a predetermined extraction method so as to extract the subject region As from the subject existing image P1, and generate an alpha map as the extraction image which indicates the position of the subject region As in the subject existing image P1 (Step S18).

Then, the subject extraction section 307 cuts out the subject region As from the subject existing image P1 by using the generated alpha map, and combines the cut-out subject region As with the predetermined one-color image P3 so as to generate the image data of the subject cutout image P2 (shown in FIG. 7C) (Step S19). More specifically, the subject extraction section 307, with respect to each pixel of the subject existing image P1, allows the pixel having an a value of 0 to pass through the predetermined one-color image P3; blends the pixel having an α value of 0<α<1 with the predetermined one-color image P3; and does not perform anything on the pixel having an α value of 1, and does not allow the pixel having an α value of 1 to pass through the predetermined one-color image P3, accordingly. Gradations are given to the edge part of the alpha map. Hence, the border part between the cut-out subject region As and the one-color image P3 (background) is vague and looks natural.

The image data of the generated subject cutout image P2 is correlated with the alpha map, which is the extraction image, and stored in the storage section 302.

The CPU of the central control section 301 transmits the image data of the generated subject cutout image P2 with the communication control section 304 to the user terminal 2 via the predetermined communication network N (Step S20).

When the communication control section 202 of the user terminal 2 receives the image data of the subject cutout image P2 (Step S21), the display section 203 displays the subject image on the display screen thereof based on the image data of the subject cutout image P2 (Step S22).

This ends the subject cutout processing.

As described above, according to the subject cutout system 100 of the present embodiment, the region Ac which serves as a reference when the subject region As is specified from the divided regions A into which the subject existing image P1 is divided by the borderline L, and the subject region As is specified from the divided regions A of the subject existing image P1 by taking the region Ac as a reference. Accordingly, it is not necessary that the borderline L is a completely closed line. It is not necessary either to specify one divided region A from the plurality of divided regions A into which the subject existing image P1 is divided by the borderline L so as to specify the subject region As. The subject region As can be appropriately specified, in particular, by excluding the region/regions Ac from the divided regions A of the subject existing image P1.

Thus, the subject region As can be simply, easily, and appropriately specified.

Furthermore, the region Ac is specified from the divided regions A of the subject existing image P1 by a predetermined mathematic operation without calculating the number of pixels of the bottom image boundary Bb of the subject existing image P1. Accordingly, for example, when the subject region As is specified from the subject existing image P1, which is an image of a person from the breasts up, namely, a bust shot, the region Ac which serves as a reference when the subject region As is specified can be appropriately specified.

For example, in a case where the borderline L is not a completely closed line, and a region enclosed by the borderline L and the bottom image boundary Bb of the subject existing image P1 is specified as a subject region, if a subject leans to one side, the left side or the right side, from the center of the image, and overlaps with the image boundary on the left side or the right side, the borderline L cannot be regarded as a completely closed line, and hence the subject region cannot be appropriately specified. Furthermore, in a case where the borderline L is not a completely closed line, and a region enclosed by the borderline L and the image boundaries B of the subject existing image P1 is about to be specified as a subject region, if a plurality of such regions exists therein, the subject region cannot be appropriately specified.

On the contrary, according to the embodiment of the present invention, even in the case where the borderline L is not a completely closed line, the subject region As can be appropriately specified by specifying the region Ac from the divided regions A of the subject existing image P1 by performing a predetermined mathematic operation without calculating the number of pixels of the bottom image boundary Bb (bottom image boundary number) of the subject existing image P1, and by specifying the subject region As from the divided regions A of the subject existing image P1 by taking the region Ac as a reference.

Furthermore, the bottom image boundary Bb can be appropriately specified from the image boundaries B of the subject existing image P1 by specifying the image boundary B which is located below the face of the subject detected by the face detection processing as the bottom image boundary Bb of the subject existing image P1. Accordingly, the region Ac and the subject region As can be appropriately specified from the divided regions A of the subject existing image P1.

Furthermore, the subject region As is specified from the divided regions A of the subject existing image P1 by taking the detection result of the face detection processing as a reference. More specifically, a divided region A having the largest number of pixels of the image boundary B located below the detected face of the subject is specified as the subject divided region As from the divided regions A of the subject existing image P1. Accordingly, for example, in the case where the subject region As is specified from the subject existing image P1 of a person from the breasts up, namely, a bust shot, the subject region As can be appropriately specified from the divided regions A of the subject existing image P1.

Furthermore, since the subject region As specified from the subject existing image P1 is extracted, the subject cutout image P2 can be appropriately generated.

The present invention is not limited to the embodiment, and hence various modifications and design changes thereof can be made without departing from the spirit of the present invention.

For example, in the embodiment, the face detection processing is performed on the subject existing image P1, and the bottom image boundary Bb and the subject region As thereof are specified by taking the detected face as a reference. However, in the case where the subject region As is specified from the subject existing image P1, which is obtained by taking an image of a person from the breasts up, namely, a bust shot, it is not always necessary for the face detection section 306 to perform the face detection processing.

In the following, a modification of the subject cutout processing is described with reference to FIG. 8.

The subject cutout processing shown in FIG. 8 is processing following the subject cutout processing shown in FIG. 5, and hence the detailed description of the subject cutout processing shown in FIG. 5 is omitted here.

As shown in FIG. 8, after the user terminal 2 transmits the setting instruction signal for the second coordinates with the communication control section 202 to the server 3 via the predetermined communication network N at Step S10 (shown in FIG. 5), the central control section 201 of the user terminal 2 judges whether or not a setting instruction is inputted based on the predetermined operation of the operation input section 205 by the user, the setting instruction for a bust shot extraction mode in which the subject region As is extracted from the subject existing image P1 which is an image of a person from the breasts up, namely, a bust shot (Step S31).

When judging that the setting instruction for the bust shot extraction mode is inputted (Step S31; YES), the CPU of the central control section 201 transmits, with the communication control section 202, a setting instruction signal outputted and inputted from the operation input section 205 to the server 3 via the predetermined communication network N (Step S32).

On the other hand, when judging that the setting instruction for the bust shot extraction mode is not inputted (Step S31; No), the CPU of the central control section 201 skips Step S32.

When the communication control section 304 of the server 3 receives the setting instruction signal for the bust shot extraction mode transmitted from the user terminal 2, the CPU of the central control section 301 sets the bust shot extraction mode so that the subject cutout processing is performed in the bust shot extraction mode (Step S33).

Then, the CPU of the central control section 301 judges whether or not the bust shot extraction mode is set (Step S34). When judging that the bust shot extraction mode is set (Step S34; YES), the CPU of the central control section 301 skips Step S13, and moves to Step S14.

At Step S14, the image boundary specification section 309 obtains the image data of the subject existing image P1, and specifies the bottom image boundary Bb of the image data thereof based on the information on the direction of the image, the information which is attached to the subject existing image P1 as the Exif tag information.

On the other hand, when judging that the bust shot extraction mode is not set (Step S34; NO), the CPU of the central control section 301 moves to Step S13, which is the same as that in the above embodiment.

Step S14 and Steps thereafter (Steps S15 to S22) are the same as those in the above embodiment, and hence the detailed description thereof is omitted.

Accordingly, when the bust shot extraction mode is set, the specification of the region Ac performed by the region specification section 308, the region Ac which serves as a reference when the subject region As is extracted, and the specification of the subject region As performed by the subject extraction section 307 can be automatically performed without the face detection processing. Hence, the load in the face detection processing can be reduced or eliminated, and the subject region As can be specified at higher speed.

Second Embodiment

Figure 9:
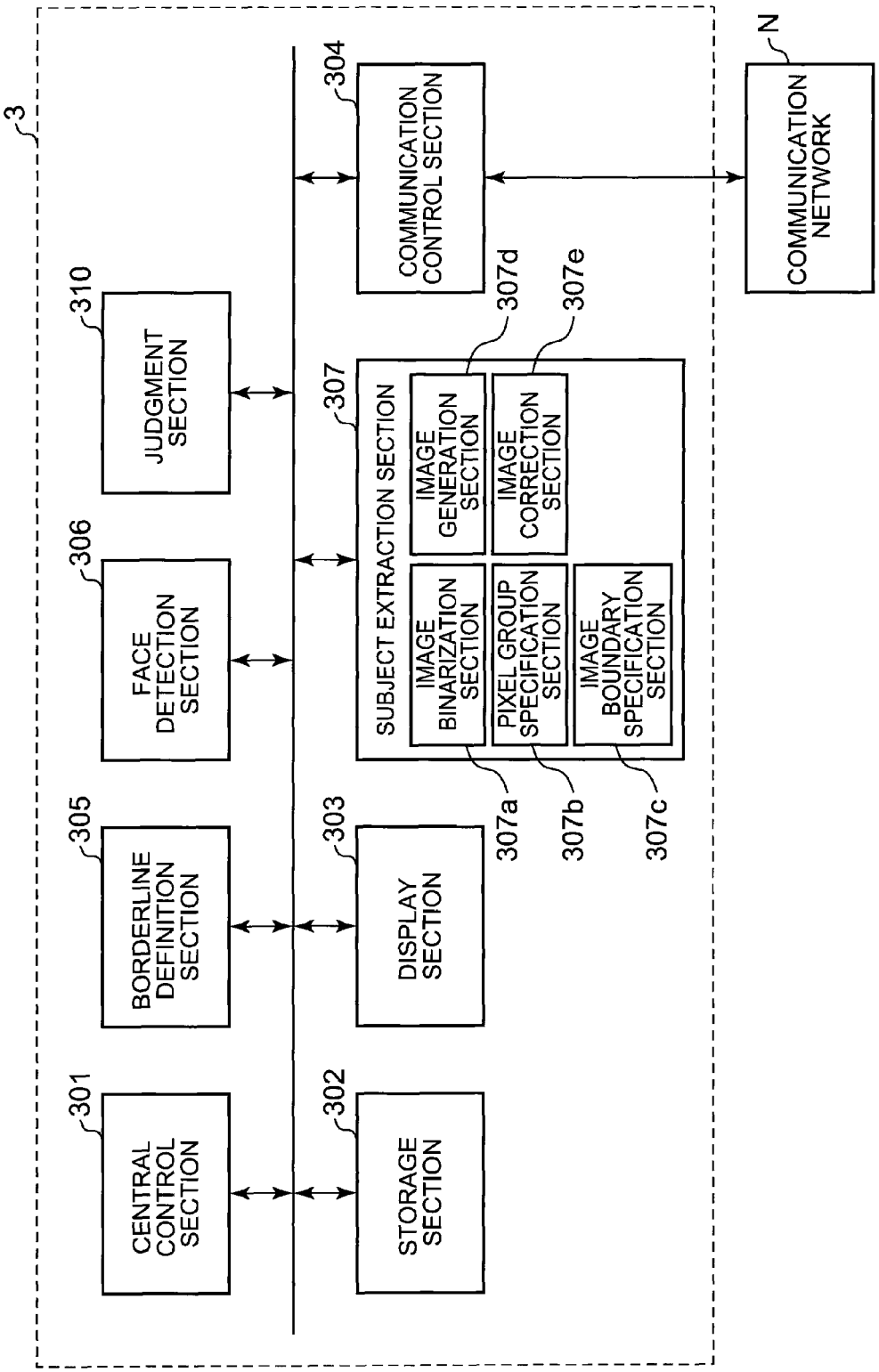
FIG. 9 is a block diagram showing a schematic configuration of a server of a subject cutout system according to a second embodiment.

The image obtained by cutting out the subject in the first embodiment may be corrected later. As shown in FIG. 9, a server 3 according to a second embodiment is different from the sever 3 according to the first embodiment in the inclusion of a subject extraction section 307, the configuration of which is different from the subject extraction section 307 according to the first embodiment, and a judgment section 310. The other configurations are the same as the configurations of the subject cutout system 100 according to the first embodiment.

The subject extraction section 307 includes an image binarization section 307a, a pixel group specification section 307b, an image boundary specification section 307c, an image generation section 307d, and an image correction section 307e.

The image binarization section 307a generates a binary image P4 for the subject existing image P1.

That is, the image binarization section 307a obtains the image data of the subject existing image P1 transmitted from the user terminal 2 and received by the communication control section 304 via the predetermined communication network N, and compares the pixel value of each pixel of the image data thereof with a predetermined threshold value so as to generate the binary image P4 for the subject existing image P1.

Figure 12A:
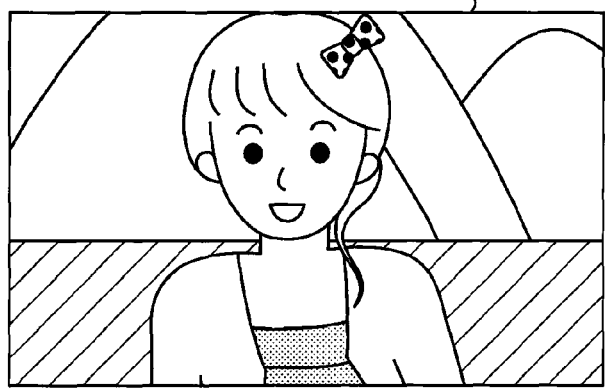
FIG. 12A schematically shows an image of the subject cutout processing shown in FIG. 10.
Figure 12B:
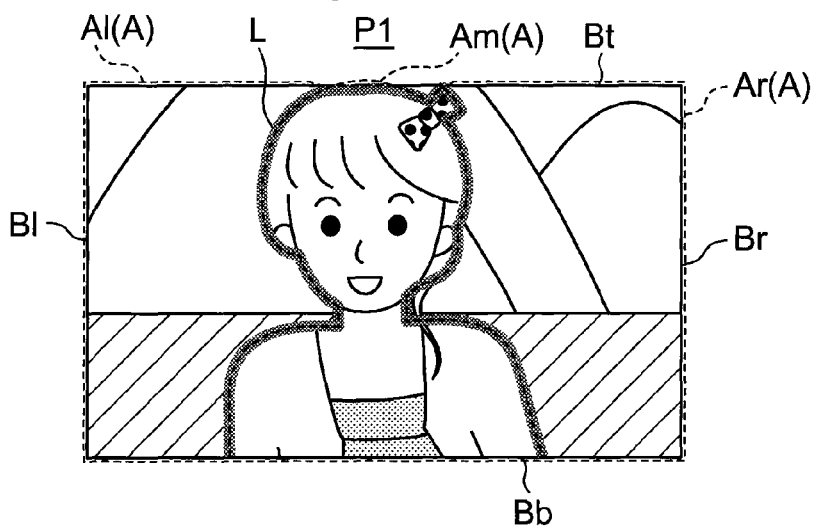
FIG. 12B schematically shows an image of the subject cutout processing shown in FIG. 10.
Figure 12C:
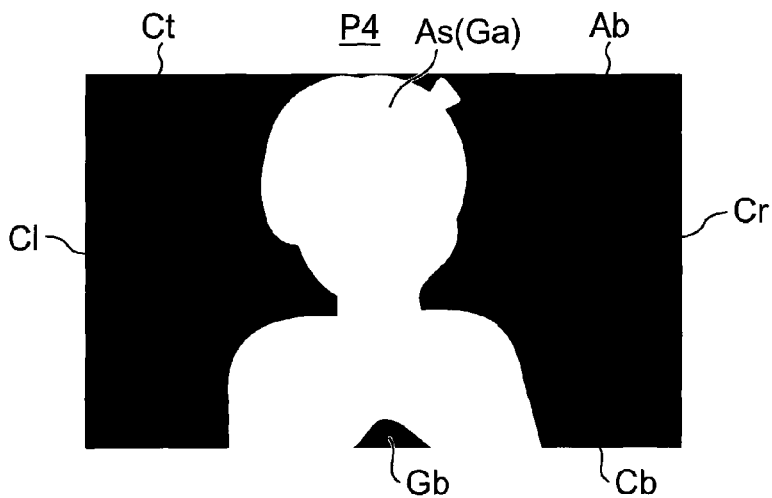
FIG. 12C schematically shows an image of the subject cutout processing shown in FIG. 10.

More specifically, as shown in FIGS. 12A to 12C, the image binarization section 307a assumes a divided region/regions A (a left divided region Al and a right divided region Ar, for example) constituting a background region Ab among the divided regions A into which the subject existing image P1 is divided by the image boundaries B and the borderline L. Next, the image binarization section 307a performs a predetermined mathematic operation based on the pixel value of each pixel of the divided regions A, and assumes that a background color of the subject is a predetermined one color. Then, the image binarization section 307a generates difference information on differences between a predetermined one-color background image and the subject existing image P1 pixel by pixel (a difference degree map, for example), and compares each of the pixel values of the pixels of the generated deference information with a predetermined threshold value, so as to binarize the pixel values, thereby generating the binary image P4 for the subject existing image P1.

In the binary image P4, for example, the pixel value for the subject region As is 1, and the pixel value for to the background region Ab is 0.

Furthermore, the image binarization section 307a has the same function as the region specification section 308 according to the first embodiment.

The pixel group specification section 307b specifies a pixel group Ga of the binary image P4 for the subject existing image P1, the pixel group Ga corresponding to the subject region As.

That is, the pixel group specification section 307b specifies the pixel group Ga of the binary image P4, the pixel group Ga in which pixels having the pixel value for the subject region As are successively disposed. More specifically, the pixel group specification section 307b performs reduction processing on the binary image P4 to eliminate regions in which differences caused by small noise or camera shake exist, thereby excluding pixel groups, the values of which are smaller than a predetermined value, and/or thin-line pixel groups produced by the camera shake. Then, the pixel group specification section 307b performs labeling processing by which a same number is attached to pixels of a same connected component so as to produce a plurality of pixel groups, and performs enlargement processing by which the reduction by the reduction processing is corrected, thereafter. The pixel group specification section 307b specifies the pixel group Ga which has the largest area (largest pixel group Ga) as a subject part, among the pixel groups of the binary image P4, the pixel groups, the pixels of which undergo the labeling processing, namely, the pixel groups in each of which pixels having the pixel value ("1", for example) for the subject region As are successively disposed.

Furthermore, the pixel group specification section 307b changes the pixel value of each pixel of a background pixel group, the pixel value which is for the background region Ab, to the pixel value for the subject region As. The background pixel group is an inside pixel group in the largest pixel group Ga of the binary image P4, the largest pixel group Ga, the pixel value of which corresponds to the subject region As. The background pixel group has a pixel percentage equal to or less than a predetermined percentage (40%, for example). The pixel percentage expresses the number of pixels of the background pixel group (inside pixel group) in the number of pixels of the largest pixel group Ga as percentage. That is, the pixel group specification section 307b performs the labeling processing inside the largest pixel group Ga specified as the subject part, and changes the pixel value of each pixel of an inside pixel group having a label percentage equal to or less than a predetermined percentage, the pixel which is for the background region Ab, to be for the subject part, so as to replace the pixel group by the subject part, thereby performing filling-up processing. The label percentage expresses the number of background labels in the number of subject-part labels as percentage.

The image boundary specification section 307c specifies a bottom image boundary (corresponding bottom image boundary) Cb from a plurality of image boundaries C of the binary image P4.

That is, the image boundary specification section 307c specifies the bottom image boundary Cb from the four image boundaries C, which are the top image boundary Ct, the bottom image boundary Cb, the left image boundary Cl, and the right image boundary Cr, of the image data of the binary image P4 generated by the image binarization section 307a. The bottom image boundary Cb of the binary image P4 corresponds to the image boundary B located at the bottom (lower side) of the subject existing image P1 displayed on a predetermined display region of the display section 203 or the like of the user terminal 2. More specifically, the image boundary specification section 307c specifies, from the plurality of image boundaries Ct, Cb, Cl, and Cr of the binary image P4, the image boundary C corresponding to the image boundary B (bottom image boundary Bb) which is located below the face of the subject in the face region detected from the subject existing image P1 by the face detection section 306, as the bottom image boundary Cb.

That is, for example, in the case where the subject existing image P1 is an image of a person as a subject from the breasts up, namely, a bust shot, the image boundary specification section 307c specifies, from the four image boundaries Ct, Cb, Cl, and Cr of the binary image P4 corresponding to the subject existing image P1, the image boundary C corresponding to the image boundary B with which an image region below the face of the person overlaps, as the bottom image boundary Cb.

Furthermore, the image boundary specification section 307c may obtain information on the direction of an image for when the subject existing image P1 is taken so as to specify the bottom image boundary Cb of the binary image P4 corresponding to the bottom image boundary Bb of the subject existing image P1, for example. The information is attached to the subject existing image P1 as Exif tag information.

Furthermore, the image boundary specification section 307c specifies, from the image boundaries C of the binary image P4, the image boundaries C except for the bottom image boundary Cb corresponding to the image boundaries B except for the bottom image boundary Bb of the subject existing image P1 displayed on a predetermined display region. That is, the image boundary specification section 307c specifies, among the plurality of image boundaries C, the top image boundary Ct, the left image boundary Cl, and the right image boundary Cr of the binary image P4.

The image generation section 307d indicates the position of the subject region As in the subject existing image P1, and generates an extraction image used for extracting the subject region As.

As the extraction image, for example, an alpha map M is used. The alpha map M shows the weight by an a value ($0 \leq \alpha \leq 1$) for each pixel of the subject existing image P1 used when alpha blending is performed on a subject image and a predetermined background.

More specifically, the image generation section 307d changes the pixel value of each pixel of a region (pixel group) Gb, the pixel value which is for the background region Ab ("0", for example), to the pixel value for the subject region As ("1", for example). The region Gb is enclosed by the largest pixel group Ga specified as the subject part by the pixel group specification section 307 and the bottom image boundary Cb of the binary image P4 specified by the image boundary specification section 307c. The image generation section 307d generates the extraction image (alpha map M) thereafter.

That is, for example, in the case where the subject existing image P1 is an image of a person as a subject from the breasts up, namely, a bust shot, the image generation section 307d assumes that the region Gb enclosed by the largest pixel group Ga and the bottom image boundary Cb is a pixel group with which an image region below the face of the person of the subject existing image P1 overlaps, namely, the subject region As. Then, the image generation section 307d changes the pixel value of the region Gb, the pixel value which is for the background region Ab, to the pixel value for the subject region As ("1", for example).

Furthermore, it is possible that the image generation section 307d does not change the pixel value of each pixel of a region (pixel group), the pixel value which is for the background region Ab, to the pixel value for the subject region As, the region which is enclosed by the largest pixel group Ga specified as the subject part by the pixel group specification section 307b and the other image boundaries C of the binary image P4 specified by the image boundary specification section 307c, namely, the top image boundary Ct, the left image boundary Cl, and the right image boundary Cr.

The image generation section 307d performs low-pass filtering on the binary image P4 in which the largest pixel group Ga corresponding to the subject region As has the pixel value of "1" and the other part corresponding to the background region Ab has the pixel value of "0", so as to produce an intermediate value at a border part therebetween, thereby creating a predetermined α value for each region. As a result, the subject region As has an α value of 1 and a transparency of 0% to a predetermined background of the subject existing image P1. On the other hand, the background part of the subject has an α value of 0 and a transparency of 100% to the predetermined background of the subject existing image P1.

Figure 13A:
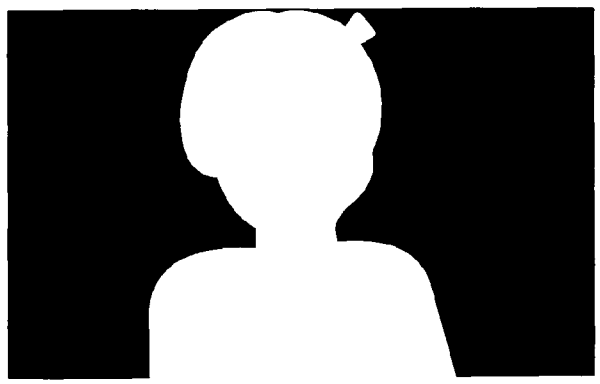
FIG. 13A schematically shows an image of the subject cutout processing shown in FIG. 10.
Figure 13B:
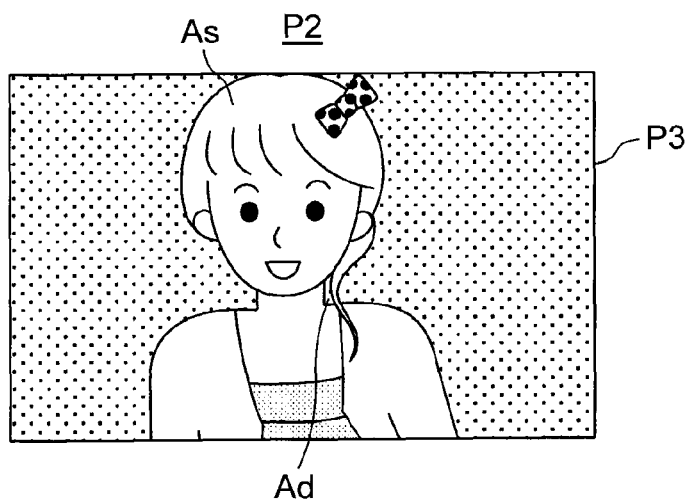
FIG. 13B schematically shows an image of the subject cutout processing shown in FIG. 10.

Then, the subject extraction section 307 combines the subject image with the predetermined one-color image P3 based on the extraction image (alpha map M) generated by the image generation section 307d in such a way as, of the pixels of the subject existing image P1, not to allow the pixels having an α value of 1 to pass through the predetermined one-color image P3, and to allow the pixels having an α value of 0 to pass through the predetermined one-color image P3, thereby generating the image data of the subject cutout image P2 (shown in FIG. 13B).

Furthermore, the image generation section 307d may generate a ternary image P5 from the binary image P4 for the subject existing image P1.

Figure 13C:
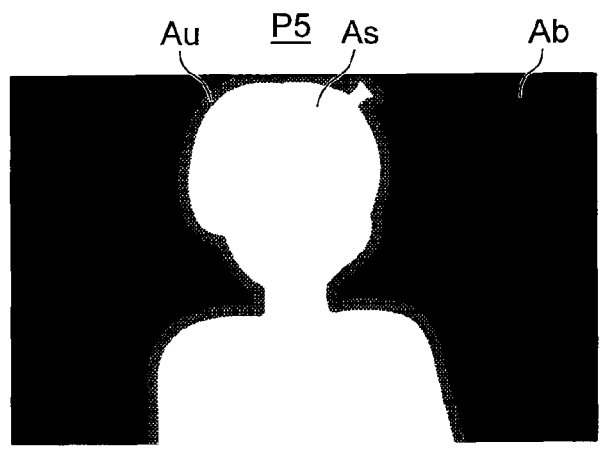
FIG. 13C schematically shows an image of the subject cutout processing shown in FIG. 10.

That is, the image generation section 307d makes a region of the binary image P4 be an unsettled region Au, with which the borderline L specified by the borderline definition section 305 overlaps. The pixel value for the unsettle region Au is not decided yet. The image generation section 307d sets a third pixel value ("0.5", for example) different from the pixel values for the subject region As and the background region Ab as the pixel value for the unsettled region Au, thereby generating the ternary image P5. More specifically, the image generation section 307d sets the third pixel value as the pixel value for the region with which the borderline L specified by the border specification section 305 overlaps (unsettled region Ac) in the binary image P4, thereby generating the ternary image P5 (shown in FIG. 13C). The binary image P4 is the binary image P4 in which the pixel value, which is for the background region Ad, of each pixel of the region Gb enclosed by the largest pixel group Ga and the bottom image boundary Cb is changed to the pixel value for the subject region As ("1", for example).

The image generation section 307d may generate an extraction image (alpha map M) by using the ternary image P5 after generating the ternary image P5 from the binary image P4.

The image correction section 307e corrects the extraction image (alpha map M) based on the predetermined operation of the operation input section 205 of the user terminal 2 by a user.

That is, when the judgment section 310 judges that an instruction is inputted, the instruction to restore the pixel value of each pixel of a changed region Ad of the extraction image, the image correction section 307e changes the pixel value of each pixel of the changed region Ad of the extraction image to the pixel value for the background pixel group, thereby correcting the extraction image. The changed region Ad is a region in which the pixel value is changed by the filling-up processing by the pixel group specification section 307b. More specifically, when the judgment section 310 judges that the instruction is inputted, the instruction to change the pixel value of a region of the extraction image, the region which corresponds to the borderline L specified by the borderline definition section 305, namely, the region having the third pixel value (unsettled region Au) of the ternary image P5, to the pixel value for the background pixel group, the image correction section 307e changes the pixel value of each pixel of the changed region Ad of the extraction image to the pixel value for the background pixel group, thereby correcting the extraction image.

Figure 14A:
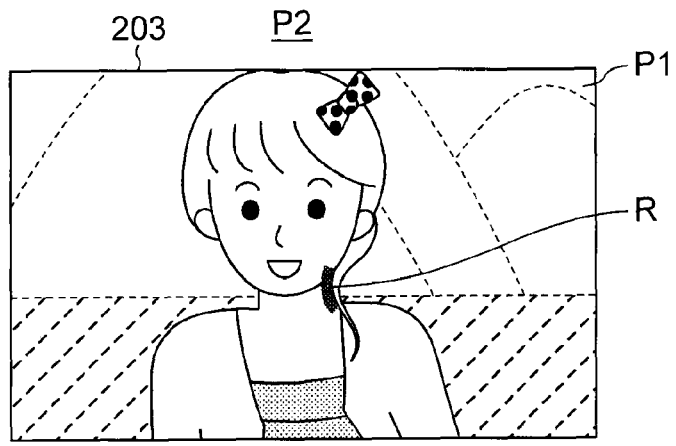
FIG. 14A schematically shows an image of the subject cutout processing shown in FIG. 10.
Figure 14B:
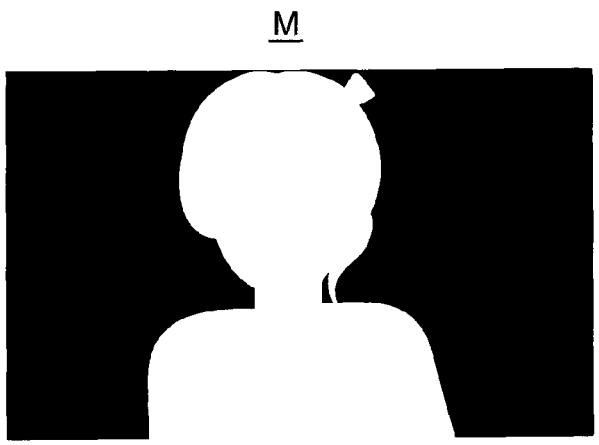
FIG. 14B schematically shows an image of the subject cutout processing shown in FIG. 10.
Figure 14C:
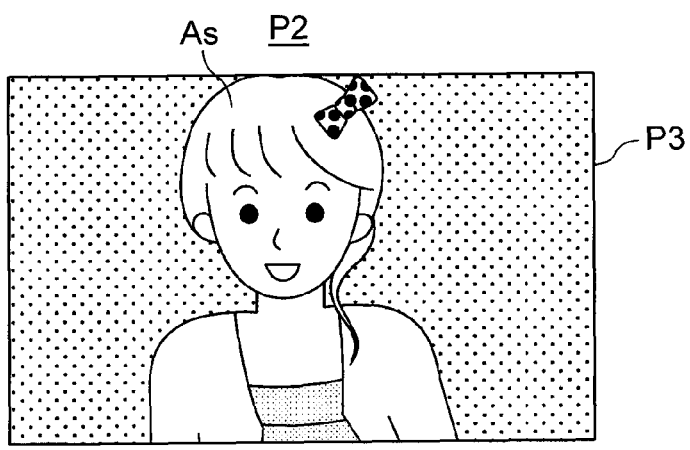
FIG. 14C schematically shows an image of the subject cutout processing shown in FIG. 10.

For example, with respect to the subject existing image P1 shown in FIG. 12A, when the pixel group specification section 307b performs the filling-up processing, the pixel value of the region enclosed by the scruff of the neck of a person as a subject and the hair thereof is automatically changed, and hence the extraction image with the change (alpha map M shown in FIG. 13A) is generated. As a result, in the subject cutout image P2 shown in FIG. 13B, the region enclosed by the scruff of the neck of the person and the hair thereof does not always become a background region. In such a case, when the judgment section 310 judges that the instruction to restore the pixel value of the region enclosed by the scruff of the neck of the person as the subject, and the hair thereof (changed region Ad) to the pixel value for the background pixel group, the image correction section 307e changes the pixel value of each pixel of the changed region Ad of the extraction image to the pixel value for the background pixel group, thereby correcting the extraction image (alpha map M shown in FIG. 14B).

The pixel value of the unsettled region Au or the background pixel group may be changed to the pixel value for the subject region As based on the predetermined operation of the operation input section 205 of the user terminal 2 by the user.

The judgment section 310 judges whether or not an instruction to correct the subject cutout image P2 is inputted.

That is, the judgment section 310 judges whether or not the instruction to correct the subject cutout image P2 is inputted based on setting signals for the coordinates of a plurality of points constituting a correction marker R drawn on the subject cutout image P2, the setting signals which are transmitted from the user terminal 2 and received by the communication control section 304 via the predetermined communication network N. More specifically, when the correction marker R is drawn on the subject cutout image P2 displayed on the display section 203 of the user terminal 2 based on the predetermined operation of the operation input section 205 of the user terminal 2 by the user, and the setting signals for the coordinates of the points constituting the correction marker R, the setting signals which are transmitted from the user terminal 2, are received by the communication control section 304, the judgment section 310 judges that the instruction to correct the subject cutout image P2 is inputted. The correction marker R is for restoring the pixel value of each pixel of the changed region Ad. The pixel value of the changed region Ad is changed by the filling-up processing by the pixel group specification section 307b.

The judgment section 310 may judge based on the ternary image P5 generated by the image generation section 307d whether or not an instruction to restore the pixel value of each pixel of the changed region Ad is inputted for a region of the extraction image (alpha map M) generated by the image generation section 307d, the region which corresponds to the borderline L, namely, the region having the third pixel value (unsettled region Au) of the ternary image P5. That is, the region having the third pixel value (unsettled region Au) of the ternary image P5 is a region, the pixel value of which is not decided yet, and hence it is unknown whether the region becomes the subject region As or the background region Ab. Accordingly, the load in the processing can be reduced by judging whether or not to correct the pixel value of only the region having the third pixel value.

Next, subject cutout processing performed by the user terminal 2 and the server 3 is described with reference to FIGS. 10 to 14C.

Figure 10:
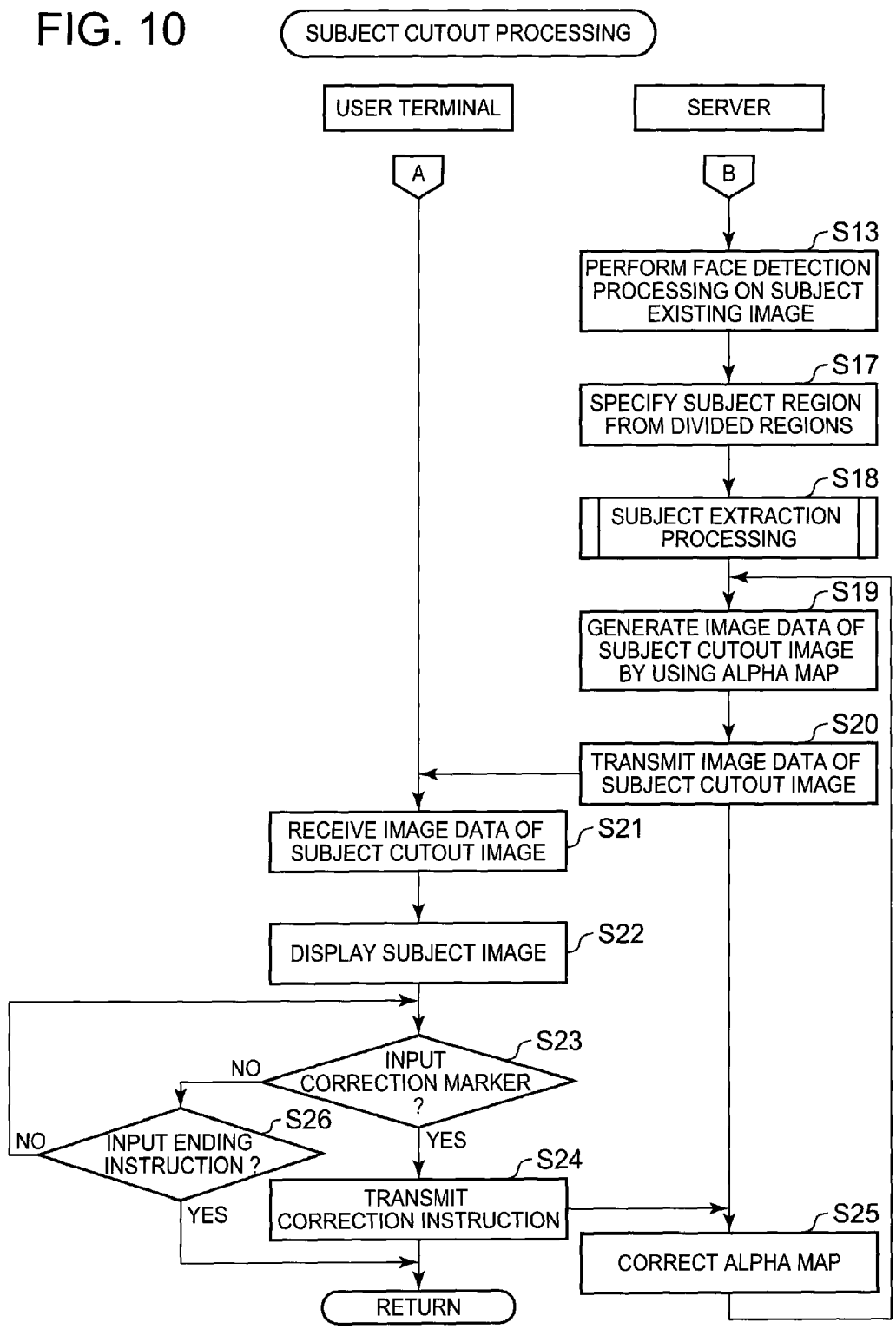
FIG. 10 is a flowchart showing subject cutout processing according to the second embodiment.
Figure 11:
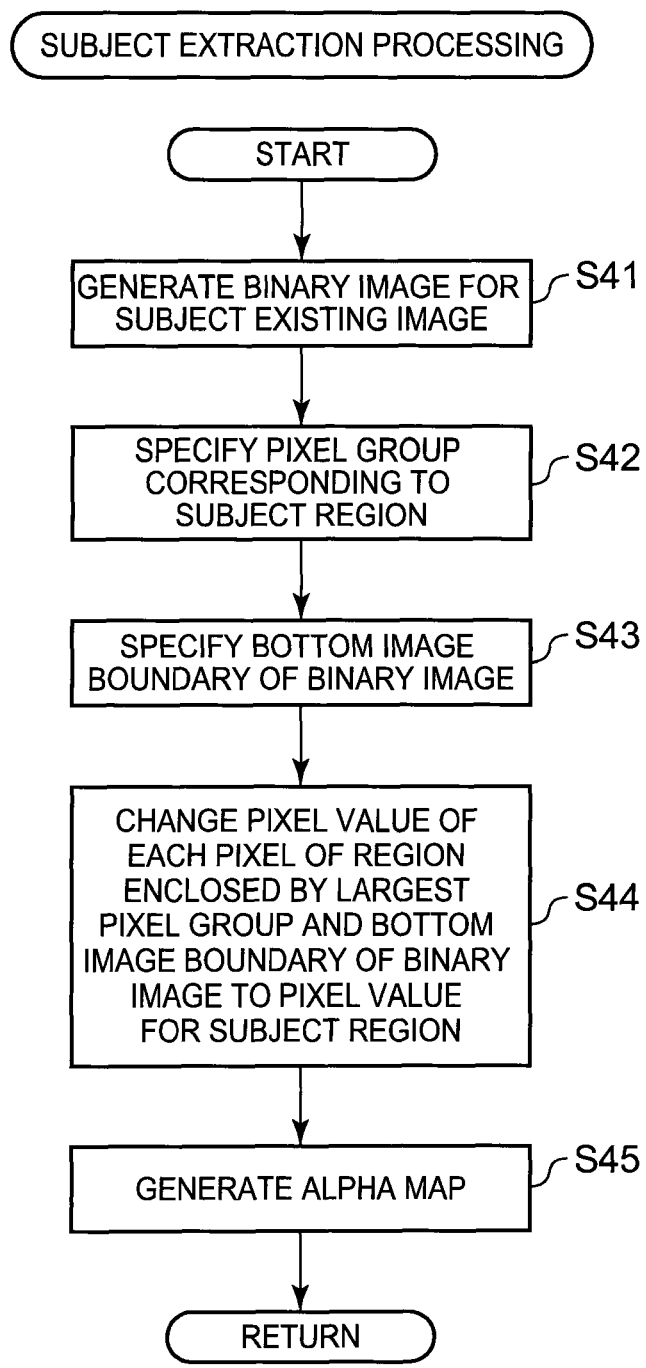
FIG. 11 is a flowchart showing subject extraction processing of the subject cutout processing shown in FIG. 10.

FIGS. 10 and 11 show a flowchart showing the subject cutout processing according to the second embodiment of the present invention. FIGS. 12A to 14C schematically show examples of images of the subject cutout processing.

In the following, the recording medium M on which the image data of the subject existing image P1 generated by the imaging apparatus 1 is recorded is attached to the recording medium control section 204 of the user terminal 2.

The flow of the subject cutout processing before the subject cutout processing according to the second embodiment is the same as the flow thereof according to the first embodiment shown in FIG. 5.

As shown in FIG. 10, the face detection section 306 obtains the image data of the subject existing image P1, and performs the predetermined face detection processing on the image data thereof so as to detect the face region (Step S13).

The image boundary specification section 307 specifies the subject region As by the predetermined specification method from the divided regions A into which the subject existing image P1 is divided by the image boundaries B, namely, the top image boundary Bt, the bottom image boundary Bb, the left image boundary Bl, and the right image boundary Br, and the borderline L (Step S17).

Step S17 in the second embodiment is the same as Step S17 in the first embodiment, and hence the detailed description thereof is omitted.

Next, the subject extraction section 307 performs the subject extraction processing by the predetermined extraction method so as to extract the subject region As from the subject existing image P1 and generate an alpha map M as the extraction image which indicates the position of the subject region As in the subject existing image P1 (Step S18).

In the following, the subject extraction processing is described with reference to FIG. 11.

As shown in FIG. 11, the image binarization section 307a of the subject extraction section 307 obtains the image data of the subject existing image P1, and compares the pixel value of each pixel of the image data thereof with a predetermined threshold value so as to generate the binary image P4 for the subject existing image P1 (Step S41).

The pixel group specification section 307b specifies the pixel group Ga of the binary image P4 for the subject existing image P1, the pixel group Ga in which pixels having the pixel value for the subject region As are successively disposed (Step S42).

More specifically, the pixel group specification section 307b performs reduction processing on the binary image P4 to eliminate regions in which differences caused by small noise or camera shake exist, thereby excluding pixel groups, the values of which are smaller than a predetermined value, and/or thin-line pixel groups produced by the camera shake. Then, the pixel group specification section 307b performs labeling processing by which a same number is attached to pixels of a same connected component so as to produce a plurality of pixel groups, and performs enlargement processing by which the reduction by the reduction processing is corrected thereafter. The pixel group specification section 307b specifies the pixel group Ga which has the largest area (largest pixel group Ga) as a subject part, among the pixel groups of the binary image P4, the pixel groups, the pixels of which undergo the labeling processing, namely, the pixel groups in each of which pixels having the pixel value ("1", for example) for the subject region As are successively disposed.

Furthermore, the pixel group specification section 307b performs the labeling processing inside the largest pixel group Ga specified as the subject part, and changes the pixel value of each pixel of an inside pixel group having a label percentage equal to or less than a predetermined percentage, the pixel value which is for the background region Ab, to the pixel value for the subject part so as to replace the pixel group by the subject part, thereby performing filling-up processing. The label percentage expresses the number of background labels in the number of subject-part labels as percentage.

Next, the image boundary specification section 307c specifies, from the plurality of image boundaries C of the binary image P4, the bottom image boundary Cb (Step S43). More specifically, the image boundary specification section 307c specifies, from the image boundaries C, namely, Ct, Cb, Cl, and Cr, the image boundary C corresponding to the image boundary B which is located below the face of the subject in the face region detected from the subject existing image P1 by the face detection section 306, as the bottom image boundary Cb.

Then, the image generation section 307d changes the pixel value of each pixel of the region Gb, the pixel value which is for the background region Ab ("0", for example), to the pixel value for the subject region As ("1", for example) (Step S44). The region Gb is enclosed by the largest pixel group Ga specified as the subject part by the pixel group specification section 307b and the bottom image boundary Cb of the binary image P4 specified by the image boundary specification section 307c. Then, the image generation section 307d generates the alpha map M as the extraction image from the binary image P4 (Step S45). More specifically, the image generation section 307d performs low-pass filtering on the binary image P4 in which the pixel value of the largest pixel group Ga corresponding to the subject part is "1", and the pixel value of the other part corresponding to the background region Ab is "0", so as to produce an intermediate value at a border part therebetween, thereby creating a predetermined α value for each region, and generating the alpha map M.

This ends the subject extraction processing.

As shown in FIG. 10, the subject extraction section 307 cuts out the subject region As from the subject existing image P1 by using the generated alpha map M, and combines the cut-out subject region As with the predetermined one-color image P3 so as to generate the image data of the subject cutout image P2 (shown in FIG. 13B) (Step S19).

Step S19 in the second embodiment, at which the image data of the subject cutout image P2 is generated, is the same as Step S19 in the first embodiment, and hence the detailed description thereof is omitted.

The image data of the generated subject cutout image P2 is correlated with the alpha map M, which is the extraction image, and stored in the storage section 302.

The CPU of the central control section 301 transmits the image data of the generated subject cutout image P2 with the communication control section 304 to the user terminal 2 via the predetermined communication network N (Step S20).

When the communication control section 202 of the user terminal 2 receives the image data of the subject cutout image P2 (Step S21), the display section 203 displays a subject image on the display screen thereof based on the image data of the subject cutout image P2 (Step S22).

Then, the central control section 201 of the user terminal 2 judges whether or not the coordinates of the plurality of points constituting the correction marker R (shown in FIG. 14A) are inputted on the subject cutout image P2 displayed on the display screen of the display section 203, based on the predetermined operation of the operation input section 205 by the user (Step S23).

When judging that the coordinates of the points constituting the correction marker R are inputted (Step S23; YES), the CPU of the central control section 201 transmits a correction instruction signal for the correction marker R with the communication control section 202, the correction instruction signal which is outputted and inputted from the operation input section 205, to the server 3 via the predetermined communication network N (Step S24).

When the communication control section 304 of the server 3 receives the correction instruction signal for the correction marker R transmitted from the user terminal 2, the judgment section 310 judges that an instruction to correct the subject cutout image P2, namely, the instruction to restore the pixel value of each pixel of the changed region Ad of the extraction image, is inputted. The changed region Ad is a region in which the pixel value is once changed by the filling-up processing by the pixel group specification section 307b. The image correction section 307e changes the pixel value of each pixel of the changed region Ad of the alpha map M, which is the extraction image, to the pixel value for the background pixel group, thereby correcting the alpha map M (shown in FIG. 14B) (Step S25).

Thereafter, the subject extraction section 307 moves to Step S19. That is, the subject extraction section 307 cuts out the subject region As from the subject existing image P1 by using the corrected alpha map M, and combines the cut-out subject region As with the predetermined one-color image P3 so as to generate the image data of the subject cutout image P2 (shown in FIG. 14C) (Step S19).

On the other hand, when judging that the coordinates of the points constituting the correction marker R are not inputted (Step S23; NO), the CPU of the central control section 201 judges whether or not an ending instruction for ending the subject cutout processing is inputted, based on the predetermined operation of the operation input section 205 by the user (Step S26).

When judging that the ending instruction for ending the subject cutout processing is not inputted (Step S26; NO), the CPU of the central control section 201 moves to Step S23, and judges whether or not the coordinates of the points constituting the correction marker M are inputted. On the other hand, when judging that the ending instruction for ending the subject cutout processing is inputted (Step S26; YES), the CPU of the central control section 201 ends the subject cutout processing.

As described above, according to the subject cutout system 100 of the second embodiment, the pixel group Ga of the binary image P4, the pixel group Ga in which pixels having the pixel value for the subject region As are successively disposed, is specified. In particular, the pixel group Ga which has the largest area is specified from the plurality of pixel groups. Then, the extraction image (alpha map M) is generated by changing the pixel value of each pixel of the region Gb of the binary image P4, the pixel value which is for the background, to the pixel value for the subject region As. The region Gb is enclosed by the specified pixel group Ga and the bottom image boundary Cb. Accordingly, the extraction image for extracting the subject region As including the subject from the subject existing image P1 can be appropriately generated. In particular, in the case where the subject existing image P1 is an image of a person as a subject from the breasts up, namely, a bust shot, the extraction image can be appropriately generated from the binary image P4. This is because: the region of the binary image P4 enclosed by the pixel group Ga and the bottom image boundary Cb is assumed as a region which overlaps with an image region of the subject existing image P1, the image region which is located below the face of the person, namely, the subject region As; and the pixel value, which is for the background region Ab, of the region Gb of the binary image P4, the region Gb which is enclosed by the specified pixel group Ga and the bottom image boundary Cb, is changed to the pixel value for the subject region As.

At the time, with respect to a region of the binary image P4, the region which is enclosed by the specified pixel group Ga and the image boundaries C corresponding to the image boundaries B except for the bottom image boundary Bb of the subject existing image P1, namely, the top image boundary Ct, the left image boundary Cl, and the right image boundary Cr, and which corresponds to the background, the pixel value of each pixel thereof, which is for the background, is not changed to the pixel value for the subject region As. Accordingly, for example, in the case where the subject existing image P1 is an image of a person as a subject from the breasts up, namely, a bust shot, the region of the binary image P4 enclosed by the specified pixel group Ga and the image boundaries C except for the bottom image boundary Cb is assumed as the background region Ab, not the subject region As, and hence the extraction image can be appropriately generated.

Furthermore, in the subject extraction processing, when the pixel group Ga of the binary image P4, the pixel group Ga having the pixel value for the subject region As, is specified, the pixel value of each pixel of the background pixel group having the pixel percentage equal to or less than the predetermined percentage, the pixel value which is for the background region Ab, is changed to the pixel value for the subject region As, whereby the filling-up processing is performed. The pixel percentage expresses a percentage of the number of pixels of the background pixel group in the number of pixels of the pixel group Ga. However, in the case where, after the extraction image is generated, an instruction to restore the pixel value of each pixel of the changed region Ad of the generated extraction image is inputted based on the predetermined operation of the operation input section 205 of the user terminal 2 by the user, the pixel value of each pixel of the changed region Ad is changed to the pixel value for the background pixel group, whereby the extraction image is corrected. Accordingly, even when the filling-up processing is automatically performed on the binary image P4, the extraction image can be corrected by taking the user's intention into consideration, and hence an extraction image which a user desires can be generated.

In particular, since the judgment whether or not to correct the pixel value of each pixel of the changed region Ad is made only for the region of the extraction image (alpha map M), the region which corresponds to the borderline L, namely, the unsettled region Au of the ternary image P5, the load in the judgment processing can be reduced, and the extraction image can be corrected at high speed. The unsettled region Au is a region, the pixel value of which is not decided yet, and hence it is unknown whether the region becomes the subject region As or the background region Ab.

The present invention is not limited to the embodiments, and hence various modifications and design changes can be made without departing from the spirit of the present invention.

For example, in the first embodiment, the central control section 201 of the user terminal 2 successively transmits the coordinates of the plurality of points of the borderline L, the points which are successively drawn on the subject existing image P1, from the user terminal 2 to the server 3 based on the predetermined operation of the mouse by a user. However, this is not a limit but an example. The coordinates of the plurality of points of the borderline L may be transmitted to the server 3 after the borderline L including the start point and the end point is drawn on the subject existing image P1 based on the predetermined operation of the mouse by the user.

Furthermore, in the first embodiment, the server (region specification apparatus) 3 which works as a web server extracts the subject region As based on the predetermined operation of the user terminal 2 by a user. However, this is not a limit but an example, and hence the configuration of the region specification apparatus can be appropriately modified. That is, the functions of the borderline definition section 305, the region specification section 308, and the subject extraction section 307, the functions which are for extracting the subject region As, may be realized by a software, and the software may be installed in the user terminal 2. Accordingly, the subject cutout processing may be performed by the user terminal 2 by itself without the communication network N.

That is, it is possible that the user terminal 2 defines the borderline L which is the boundary in the subject existing image P1 displayed on the display section 203; specifies, from the divided regions A into which the subject existing image P1 is divided by the borderline L, the region Ac which serves as a reference when the subject region As is extracted; and specifies and extracts the subject region As from the divided regions A of the subject existing image P1 by taking the specified region Ac as a reference.

Furthermore, in the second embodiment, the region Ac is specified from the divided regions A into which the subject existing image P1 is divided by the borderline L, the region Ac which serves as a reference when the subject region As is extracted, and the subject extraction section 307 specifies and extracts the subject region As from the divided regions A of the subject existing image P1 by taking the region Ac as a reference. However, the subject region As may be specified without specifying the region Ac. That is, the subject extraction section 307 may extract, among the plurality of divided regions A, the divided region A having the smallest number of pixels of the image boundaries B (middle divided region Am, for example) constituting the edge part of the divided region A as the subject region As, without calculating (counting) the number of pixels of the image boundary B corresponding to the bottom image boundary Cb as the number of the image boundaries B constituting the edge part thereof.

Furthermore, in the second embodiment, the subject extraction section 307 excludes the left divided region Al and the right divided region Ar specified as the regions Ac from the list of candidates for the subject region As, and specifies the middle divided region Am which has the largest number of pixels of the bottom image boundary Bb as the subject region As. However, it is not necessary to specify the region having the largest number of pixels of the bottom image boundary Bb as the subject region As. That is, simply, from the divided regions A of the subject existing image P1, a divided region A which remains after the left divided region Al and the right divided region Ar specified as the regions Ac are excluded from the list of candidates for the subject region As may be specified as the subject region As.

Furthermore, in the second embodiment, the server (region specification apparatus) 3 which works as a web server generates the extraction image (alpha map M) based on the predetermined operation of the user terminal 2 by a user. However, this is not a limit but an example, and hence the configuration of the region specification apparatus can be appropriately modified. That is, the function of the subject extraction section 307 to specify the subject region may be realized by a software, and the software may be installed in the user terminal 2. Accordingly, the user terminal 2 can perform the subject cutout processing by itself without the communication network N.

That is, it is possible that the user terminal 2 specifies the pixel group Ga of the binary image P4, the pixel group Ga in which pixels having the pixel value for the subject region As are successively disposed; specifies, from the image boundaries C of the binary image P4, the bottom image boundary Cb corresponding to the bottom image boundary Bb of the subject existing image P1 displayed on the predetermined display screen; and changes the pixel value, which is for the background, of each pixel of the region of the binary image P4, the region which is enclosed by the pixel group Ga and the bottom image boundary Cb, to the pixel value for the subject region As.

Furthermore, in the first embodiment and the second embodiment, a personal computer is used as the user terminal 2. However, this is not a limit but an example, and hence another element may be used as needed. For example, a mobile phone or the like may be used.

Furthermore, in the first embodiment and the second embodiment, the subject cutout system 100 may include a printing apparatus, and the printing apparatus may print the subject image of the subject cutout image P2 generated by the server 3 on a predetermined printing base material by a predetermined printing method so as to create print of the subject image. Furthermore, the server 3 may combine the generated subject cutout image P2 with a predetermined background image by using an alpha map so as to generate a subject combined image (not shown). In this case, the printing apparatus may create print of the subject combined image.

Control information on prohibition of predetermined changes may be embedded in the image data of the subject cutout image P2 or the subject combined image by a user.

Furthermore, in the first embodiment, functions as a definition section, a reference region specification section, and a subject region specification section are realized by the borderline definition section 305, the region specification section 308, and the subject extraction section 307 being driven under the control of the central control section 301. However, this is not a limit. The functions may be realized by the CPU of the central control section 301 executing a predetermined program or the like.

That is, a program including a definition processing routine, a reference region specification processing routine, and a subject region specification processing routine is stored in a program memory (not shown) which stores programs. Then, the definition processing routine may make the CUP of the central control section 301 function as the definition section which optionally defines the borderline L on the subject existing image P1 displayed on the predetermined display region. Furthermore, the reference region specification processing routine may make the CPU of the central control section 301 function as the reference region specification section which specifies the reference region (region Ac) from the divided regions A into which the subject existing image P1 is divided by the borderline L, the reference region which has the pixel percentage equal to or more than a predetermined percentage. The pixel percentage is a percentage of pixels of the image boundaries B constituting the edge part of a divided region A in all the pixels of the edge part of the divided region A. Furthermore, the subject region specification processing routine may make the CPU of the central control section 301 function as the subject region specification section which specifies the subject region As from the divided regions A of the subject existing image P1 by taking the reference region specified by the reference region specification section as a reference.

Similarly, in the first embodiment, functions as an image boundary specification section and a detection section may also be realized by the CPU of the central control section 301 of the server 3 executing a predetermined program or the like.

In the second embodiment, functions as a pixel group specification section, a corresponding bottom image boundary specification section, and a change section are realized by the pixel group specification section 307b, the image boundary specification section 307c, and the image generation section 307d of the subject extraction section 307 being driven under the control of the central control section 301. However, this is not a limit. The functions may be realized by the CPU of the central control section 301 executing a predetermined program or the like.

That is, a program including a pixel group specification processing routine, a corresponding bottom image boundary specification processing routine, and a change processing routine is stored in a program memory (not shown) which stores programs. Then, the pixel group specification processing routine may make the CPU of the central control section 301 function as the pixel group specification section which specifies a pixel group in which pixels having the pixel value for the subject region of the subject existing image P1 are successively disposed. Furthermore, the corresponding bottom image boundary specification processing routine may make the CPU of the central control section 301 function as the corresponding bottom image boundary specification section which specifies a corresponding bottom image boundary corresponding to a bottom image boundary of a plurality of image boundaries of the subject existing image P1, the bottom image boundary which is located at the bottom of the subject existing image P1 displayed on a predetermined display region. Furthermore, the change processing routine may make the CPU of the central control section 301 function as the change section which changes pixels of a region (pixel group), the pixels which are for the background, to pixels for the subject region. The region is enclosed by the pixel group specified by the pixel group specification section and the corresponding bottom image boundary specified by the corresponding bottom image boundary specification section.

Similarly, in the second embodiment, functions as a detection section, a judgment section, a correction section, and a definition section may also be realized by the CPU of the central control section 301 of the server 3 executing a predetermined program or the like.

Furthermore, as a computer readable medium to store programs to perform the processing described above, other than a ROM and a hard disk, a nonvolatile memory such as a flash memory and a potable recording medium such as a CD-ROM can be used. Furthermore, as a medium to provide data of the programs via a predetermined communication line, a carrier wave can be used.

What is claimed is:

1. A region specification method of specifying a subject region including a subject from a subject existing image in which a background and the subject exist, the region specification method comprising:
    calculating an image boundary pixel number of an image boundary of the subject existing image constituting an edge part of each of divided regions into which the subject existing image is divided by a borderline defined on the subject existing image;
    specifying, from the divided regions, a reference region having a pixel percentage equal to or more than a predetermined percentage, the pixel percentage indicating the calculated image boundary pixel number in a total pixel number of the edge part; and
    specifying the subject region by excluding the specified reference region from the divided regions of the subject existing image.

2. The region specification method according to claim 1, further comprising:
    specifying a bottom image boundary from the image boundary of the subject existing image displayed on a predetermined display region,
    wherein in the specifying of the reference region, the reference region is specified by performing a predetermined mathematic operation without calculating a bottom image boundary pixel number of the specified bottom image boundary in the calculating.

3. The region specification method according to claim 2, further comprising:
    detecting a face of the subject from the subject existing image,
    wherein in the specifying of the bottom image boundary, a specific image boundary of the image boundary of the subject existing image is specified as the bottom image boundary, the specific image boundary being located below the detected face of the subject.

4. The region specification method according to claim 1 further comprising:
    detecting a face of the subject from the subject existing image,
    wherein in the specifying of the subject region, the subject region is specified from the divided regions of the subject existing image by taking a detection result obtained in the detecting as a reference.

5. The region specification method according to claim 4, wherein in the specifying the subject region, a divided region of the divided regions of the subject existing image is specified as the subject region, the divided region including a first image boundary of the image boundary of the subject existing image most, the first image boundary being located below the face of the subject detected in the detecting.

6. The region specification method according to claim 4, wherein in the specifying of the subject region, a divided region including the detected face of the subject, of the divided regions of the subject existing image, is specified as the subject region.

7. The region specification method according to claim 1, further comprising:
    setting a predetermined mode to specify the subject region from the subject existing image of the subject from a breast up,
    wherein when the predetermined mode is set, processing to specify the reference region and processing to specify the subject region are performed in the specifying of the reference region and in the specifying of the subject region, respectively.

8. The region specification method according to claim 1, wherein in the specifying of the subject region, processing to extract the subject region specified from the subject existing image is performed.

9. A region specification method of specifying a subject region including a subject from a subject existing image in which a background and the subject exist, the region specification method comprising:
    defining a borderline; and
    specifying a divided region of a plurality of divided regions into which the subject existing image is divided by the borderline defined on the subject existing image as the subject region, without calculating a bottom image boundary pixel number of a bottom image boundary of an image boundary of the subject existing image, the divided region having a smallest image boundary pixel number of the image boundary constituting an edge part of the divided region.

10. A region specification apparatus which specifies a subject region including a subject from a subject existing image in which a background and the subject exist, the region specification apparatus comprising:
    a definition section which defines a borderline on the subject existing image displayed on a predetermined display region;
    a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and
    a subject region specification section which specifies the subject region by excluding the reference region specified by the reference region specification section from the divided regions of the subject existing image.

11. A non-transitory computer-readable recording medium recording a program allowing computer of a region specification apparatus which specifies a subject region including a subject from a subject existing image in which a background and the subject exist to function as elements comprising:
    a definition section which defines a borderline on the subject existing image displayed on a predetermined display region;
    a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and a subject region specification section which specifies the subject region by excluding the reference region specified by the reference region specification section from the divided regions of the subject existing image.

12. A server connected with a terminal apparatus via a network, the server comprising:

a reception section which receives image data of a subject existing image and a definition instruction to define a borderline on the subject existing image from the terminal apparatus;

a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and a subject region specification section which specifies a subject region including a subject by excluding the reference region specified by the reference region specification section from the divided regions of the subject existing image.

13. A system comprising:

a terminal apparatus; and a server connected with the terminal apparatus via a network, wherein the terminal apparatus includes:

a transmission section which transmits image data of a subject existing image and a definition instruction to define a borderline on the subject existing image to the server, and wherein the server includes:

a reception section which receives the image data of the subject existing image and the definition instruction to define the borderline on the subject existing image transmitted from the terminal apparatus;

a reference region specification section which calculates an image boundary pixel number of an image boundary of the subject existing image constituting an edge part of each of divided regions into which the subject existing image is divided by a borderline defined on the subject existing image, and which specifies, from the divided regions, a reference region having a pixel percentage equal to or more than a predetermined percentage, the pixel percentage indicating the calculated image boundary pixel number in a total pixel number of the edge part; and a subject region specification section which specifies a subject region including a subject by excluding the reference region specified by the reference region specification section from the divided regions of the subject existing image.

* * * * *

UNITED STATES PATENT AND TRADEMARK OFFICE
CERTIFICATE OF CORRECTION

| | | |
|---|---|---|
| PATENT NO. | : 8,670,616 B2 | |
| APPLICATION NO. | : 13/908370 | |
| DATED | : March 11, 2014 | |
| INVENTOR(S) | : Akira Hamada | |

It is certified that error appears in the above-identified patent and that said Letters Patent is hereby corrected as shown below:

In the Claims

Column 31, line 62, (Claim 5, line 2), after "specifying" insert --of--.

Signed and Sealed this
Ninth Day of September, 2014

Michelle K. Lee
*Deputy Director of the United States Patent and Trademark Office*